(12) United States Patent
Ishii

(10) Patent No.: US 10,882,470 B2
(45) Date of Patent: Jan. 5, 2021

(54) STRUCTURE FOR SUPPRESSING NOISE INTO VEHICLE PASSENGER COMPARTMENT

(71) Applicant: TOYOTA JIDOSHA KABUSHIKI KAISHA, Aichi-ken (JP)

(72) Inventor: Naoyuki Ishii, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/376,409

(22) Filed: Apr. 5, 2019

(65) Prior Publication Data
US 2019/0359151 A1 Nov. 28, 2019

(30) Foreign Application Priority Data
May 24, 2018 (JP) .................................. 2018-099942

(51) Int. Cl.
*B60R 13/08* (2006.01)
*G10K 11/162* (2006.01)

(52) U.S. Cl.
CPC .......... *B60R 13/083* (2013.01); *G10K 11/162* (2013.01)

(58) Field of Classification Search
CPC ... B60R 13/08; B60R 13/083; B60R 13/0815; G10K 11/162; G10K 11/168

USPC ........................................................ 296/39.3
See application file for complete search history.

(56) References Cited

U.S. PATENT DOCUMENTS 5,817,408 A * 10/1998 Orimo .................... B32B 27/12
428/218
2017/0259757 A1* 9/2017 Godano ................. B60N 3/042

FOREIGN PATENT DOCUMENTS

| DE | 2732483 | * | 2/1979 |
| JP | 2005-112088 A | | 4/2005 |

OTHER PUBLICATIONS

Unpublished U.S. Appl. No. 16/259,970, filed Jan. 28, 2019.

* cited by examiner

*Primary Examiner* — Dennis H Pedder
(74) *Attorney, Agent, or Firm* — Hauptman Ham, LLP

(57) ABSTRACT

A structure for suppressing noise into a vehicle passenger compartment includes: a dash panel that separates a vehicle passenger compartment and a power unit chamber that is disposed at a vehicle front side; an instrument panel that covers the dash panel from a vehicle rear side, and that has a lower wall portion which extends toward a vehicle front side and forms an opening portion with the dash panel; and a sound insulating member that is disposed so as to cover the opening portion or is disposed so as to partition a space portion, which is between the dash panel and the instrument panel, in a vehicle transverse direction.

10 Claims, 15 Drawing Sheets

STRUCTURE FOR SUPPRESSING NOISE INTO VEHICLE PASSENGER COMPARTMENT

CROSS-REFERENCE TO RELATED APPLICATION

This application is based on and claims priority under 35 USC 119 from Japanese Patent Application No. 2018-099942 filed on May 24, 2018, the disclosure of which is incorporated by reference herein in its entirety.

BACKGROUND

Technical Field

The present invention relates to a structure for suppressing noise into a vehicle passenger compartment.

Related Art

Japanese Patent Application Laid-Open (JP-A) No. 2005-112088 discloses a vehicle in which a densely-porous sound absorber is mounted to a dash panel via an air layer.

In the vehicle of JP-A No. 2005-112088, an opening portion is formed between the dash panel and the front end surface of the lower wall portion of the instrument panel. Here, some of the noise that is due to the driving of the engine and the like that are within the power unit chamber of the vehicle, and some of the noise that is due to road noise of the front wheels, is insulated by the dash panel, but the remaining noise is transmitted to the space portion that is between the dash panel and the instrument panel. Then, this noise is transmitted from the space portion through the opening portion into the passenger compartment.

Namely, at the vehicle, there is room for improvement with regard to suppressing noise that is transmitted to the passenger compartment from the opening portion that is formed by the dash panel and the lower wall portion of the instrument panel.

SUMMARY

In view of the above-described circumstances, an object of the present invention is to provide a structure for suppressing noise into a vehicle passenger compartment that can suppress noise that is transmitted into a vehicle passenger compartment from an opening portion that is formed by a dash panel and a lower wall portion of an instrument panel.

A structure for suppressing noise into a vehicle passenger compartment relating to a first aspect of the present invention includes: a dash panel that separates the vehicle passenger compartment and a power unit chamber that is disposed at a vehicle front side; an instrument panel that covers the dash panel from a vehicle rear side, and that has a lower wall portion which extends toward a vehicle front side and forms an opening portion with the dash panel; and a sound insulating member that is disposed so as to cover the opening portion or is disposed so as to partition a space portion, which is between the dash panel and the instrument panel, in a vehicle transverse direction.

In the structure for suppressing noise into the vehicle passenger compartment of the first aspect, noise from the power unit chamber side with respect to the dash panel is transmitted to the space portion that is between the dash panel and the instrument panel. Some of the noise transmitted to this space portion is reflected at the instrument panel, and is transmitted toward the opening portion. Here, the noise that is transmitted toward the opening portion is, at the sound insulating member that covers the opening portion or at the sound insulating member that partitions the space portion, reduced by the dispersing effect that is due to reflection or the like, and by the expending effect by which the noise is expended as kinetic energy for vibrating the sound insulating member, and the like. Due thereto, the noise that is transmitted from the opening portion to the vehicle passenger compartment is reduced as compared with noise in a structure that does not have the sound insulating member. Thus, noise that is transmitted from the opening portion to the vehicle passenger compartment can be suppressed.

In a structure for suppressing noise into a vehicle passenger compartment relating to a second aspect of the present invention, the sound insulating member has a base portion that is mounted to a rear surface of the dash panel, and a cover portion that extends from the base portion toward the vehicle rear side, that contacts the lower wall portion, and that covers the opening portion.

In the structure for suppressing noise into a vehicle passenger compartment of the second aspect, the noise, which heads from the power unit chamber side toward the space portion that is between the dash panel and the instrument panel, is reduced by the dispersing effect, the expending effect and the like at the base portion that is mounted to the dash panel.

Moreover, noise, which heads from the space portion, which is between the dash panel and the instrument panel, through the opening portion toward the vehicle passenger compartment, is reduced by the dispersing effect, the expending effect and the like at the cover portion that covers the opening portion. In this way, because noise is reduced in two stages, noise that is transmitted from the opening portion to the vehicle passenger compartment can be suppressed more.

In a structure for suppressing noise into a vehicle passenger compartment relating to a third aspect of the present invention, the base portion is elastically deformable, the sound insulating member has a high-density portion having a density higher than a density of the base portion, and the high-density portion is mounted to the base portion from the vehicle rear side at further toward a vehicle lower side than the opening portion.

In the structure for suppressing noise into a vehicle passenger compartment of the third aspect, noise, which heads from the power unit chamber side via the dash panel directly toward the vehicle passenger compartment, exists further toward the vehicle lower side than the opening portion. Here, due to the elastically deformable base portion functioning as a spring, some of the energy of the noise is converted into kinetic energy that elastically deforms the base portion, and is expended. Moreover, due to the high-density portion functioning as a mass, resistance force that is due to the self-weight (gravitational acceleration) of the high-density portion damps vibrations of the base portion. In this way, some of the energy of the noise is damped by the base portion and the high-density portion. Therefore, noise, which heads from the power unit chamber side via the dash panel directly toward the vehicle passenger compartment, can be suppressed.

In a structure for suppressing noise into a vehicle passenger compartment relating to a fourth aspect of the present invention, the sound insulating member has a base portion that is mounted to a rear surface of the dash panel, and a partitioning portion that extends from the base portion toward the vehicle rear side, that contacts the lower wall portion, and that partitions the space portion into a driver's seat side and a front passenger's seat side.

In the structure for suppressing noise into a vehicle passenger compartment of the fourth aspect, noise, which heads from the power unit chamber side toward the space portion that is between the dash panel and the instrument panel, is reduced by the dispersing effect, the expending effect, and the like at the base portion that is mounted to the dash panel. Moreover, at this space portion, noise, which heads from the front passenger's seat side toward the driver's seat side, and noise, which heads for the driver's seat side toward the front passenger's seat side, are reduced by the dispersing effect, the expending effect and the like at the partitioning portion. In this way, noise heading from the power unit chamber side toward the space portion is reduced, and noise heading toward the driver's seat side and noise heading toward the front passenger's seat side at the space portion are reduced. Therefore, noise that is transmitted from the opening portion to the vehicle passenger compartment can be suppressed more.

In a structure for suppressing noise into a vehicle passenger compartment relating to a fifth aspect of the present invention, the base portion is elastically deformable, the sound insulating member has a high-density portion having a density higher than a density of the base portion, and the high-density portion is mounted to the base portion from the vehicle rear side at further toward a vehicle lower side than the opening portion.

In the structure for suppressing noise into a vehicle passenger compartment of the fifth aspect, noise, which heads from the power unit chamber side via the dash panel directly toward the vehicle passenger compartment, exists further toward the vehicle lower side than the opening portion. Here, due to the elastically deformable base portion functioning as a spring, some of the energy of the noise is converted into kinetic energy that elastically deforms the base portion, and is expended. Moreover, due to the high-density portion functioning as a mass, resistance force that is due to the self-weight (gravitational acceleration) of the high-density portion damps vibrations of the base portion. In this way, some of the energy of the noise is damped by the base portion and the high-density portion. Therefore, noise, which heads from the power unit chamber side via the dash panel directly toward the vehicle passenger compartment, can be suppressed.

In a structure for suppressing noise into a vehicle passenger compartment relating to a sixth aspect of the present invention, the sound insulating member has a cover portion that extends from the base portion toward the vehicle rear side, that contacts the lower wall portion, and that covers the opening portion.

In the structure for suppressing noise into a vehicle passenger compartment of the sixth aspect, noise, which heads from the power unit chamber side toward the space portion that is between the dash panel and the instrument panel, is reduced by the dispersing effect, the expending effect, and the like at the base portion that is mounted to the dash panel.

Moreover, noise, which heads from the space portion, which is between the dash panel and the instrument panel, through the opening portion toward the vehicle passenger compartment, is reduced by the dispersing effect, the expending effect, and the like at the cover portion that covers the opening portion. In this way, because noise can be reduced in two stages, noise that is transmitted from the opening portion to the vehicle passenger compartment can be suppressed further.

In a structure for suppressing noise into a vehicle passenger compartment relating to a seventh aspect of the present invention, the high-density portion contacts the cover portion. In the structure for suppressing noise into a vehicle passenger compartment of the seventh aspect, due to the high-density portion, which is mounted to the base portion at further toward the vehicle lower side than the opening portion, contacting the cover portion, the cover portion is supported by the high-density portion. Due thereto, deformation due to self-weight of the cover portion is suppressed by the reaction force received from the high-density portion, and therefore, the shape of the cover portion can be maintained.

In a structure for suppressing noise into a vehicle passenger compartment relating to an eighth aspect of the present invention, a size of the opening portion at a front passenger's seat side is small as compared with a size of the opening portion at a driver's seat side, and a mass of a portion, which is positioned further toward the front passenger's seat side than a vehicle transverse direction center, of the sound insulating member is small as compared with a mass of a portion, which is positioned further toward the driver's seat side than the vehicle transverse direction center, of the sound insulating member.

In the structure for suppressing noise into a vehicle passenger compartment of the eighth aspect, the size of the opening portion at the front passenger's seat side is small as compared with the size of the opening portion at the driver's seat side. Therefore, the noise, which passes through the opening portion at the front passenger's seat side from the space portion at the front passenger's seat side, is small as compared with the noise which passes through the opening portion from the space portion at the driver's seat side. Namely, the noise, which is transmitted from the opening portion at the front passenger's seat side to the vehicle passenger compartment, is smaller than the noise that is transmitted from the opening portion at the driver's seat side to the vehicle passenger compartment. Here, even if the mass of the sound insulating member that is positioned at the front passenger's seat side is small as compared with the mass of the sound insulating portion that is positioned at the driver's seat side, because the noise at the front passenger's seat side is small, it is difficult for noise to be transmitted to the vehicle passenger compartment. Namely, because noise is suppressed without excessively increasing the mass of the sound insulating member at the front passenger's seat side, at the front passenger's seat side, the soundproofing quality becoming excessive can be suppressed.

In a structure for suppressing noise into a vehicle passenger compartment relating to a ninth aspect of the present invention, slits through which arm portions are inserted are formed in the cover portion at positions corresponding to the opening portion at a driver's seat side.

In the structure for suppressing noise into a vehicle passenger compartment relating to the ninth aspect, the arm portions can be inserted through and disposed within the slits and the opening portion.

In accordance with the structure for suppressing noise into a vehicle passenger compartment of the first aspect, noise that is transmitted from the opening portion, which is formed by the dash panel and the lower wall portion of the instrument panel, to the vehicle passenger compartment can be suppressed.

In accordance with the structure for suppressing noise into a vehicle passenger compartment of the second aspect, noise that is transmitted from the opening portion to the vehicle passenger compartment can be suppressed more.

In accordance with the structure for suppressing noise into a vehicle passenger compartment of the third aspect, noise, which heads from the power unit chamber side via the dash panel directly toward the vehicle passenger compartment, can be suppressed.

In accordance with the structure for suppressing noise into a vehicle passenger compartment of the fourth aspect, noise that is transmitted from the opening portion to the vehicle passenger compartment can be suppressed more.

In accordance with the structure for suppressing noise into a vehicle passenger compartment of the fifth aspect, noise, which heads from the power unit chamber side via the dash panel directly toward the vehicle passenger compartment, can be suppressed.

In accordance with the structure for suppressing noise into a vehicle passenger compartment of the sixth aspect, noise that is transmitted from the opening portion to the vehicle passenger compartment can be suppressed more.

In accordance with the structure for suppressing noise into a vehicle passenger compartment of the seventh aspect, the shape of the cover portion can be maintained.

In accordance with the structure for suppressing noise into a vehicle passenger compartment of the eighth aspect, at the front passenger's seat side, the soundproofing quality becoming excessive can be suppressed.

In accordance with the structure for suppressing noise into a vehicle passenger compartment of the ninth aspect, the arm portions can be inserted through and disposed in the slits and the opening portion.

BRIEF DESCRIPTION OF THE DRAWINGS

Exemplary embodiments will be described in detail based on the following figures, wherein.

DETAILED DESCRIPTION

First Embodiment

A vehicle 10 of a first embodiment is described. Arrow FR that is shown appropriately in the respective drawings indicates the vehicle forward direction (advancing direction), arrow UP indicates the vehicle upward direction, and arrow OUT indicates a vehicle transverse direction outer side. Hereinafter, when description is given merely by using longitudinal, vertical and left-right directions, they refer to the longitudinal of the vehicle longitudinal direction, the vertical of the vehicle vertical direction, and the left and the right of the vehicle transverse direction when facing in the advancing direction, unless otherwise indicated.

Figure 1:
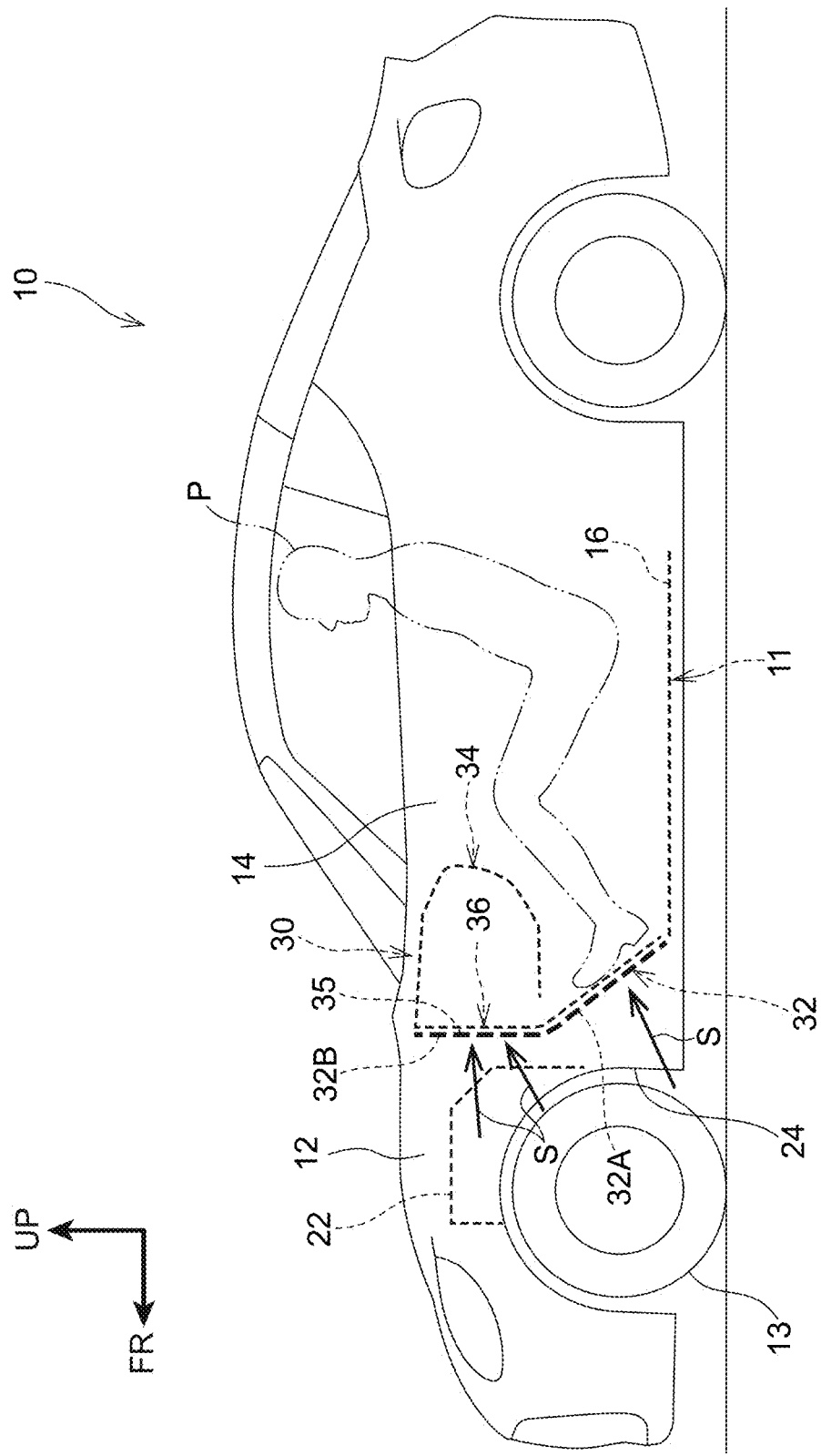
FIG. 1 is an overall structural drawing of a vehicle relating to a first embodiment.

Note that noise in the vehicle 10 is shown schematically by arrows S in FIG. 1.

The vehicle 10 shown in FIG. 1 is structured to include a vehicle body 11 and a noise suppressing structure 30 that serves as an example of the structure for suppressing noise into a vehicle passenger compartment. The vehicle 10 is a right-hand-drive vehicle as an example. Moreover, the vehicle 10 has a power unit chamber 12 that is disposed at the vehicle front side, and a passenger compartment 14 in which are provided unillustrated seats in which vehicle occupants P sit. A power unit 22 is housed in the power unit chamber 12.

The vehicle body 11 includes a floor panel 16 that structures the floor of the passenger compartment 14. An unillustrated floor tunnel, which protrudes-out toward the vehicle upper side and extends in the vehicle longitudinal direction, is provided at the vehicle transverse direction substantially central portion of the floor panel 16. The front portion of the passenger compartment 14 is sectioned by the floor tunnel into a driver's seat 21 and a front passenger's seat 23 (see FIG. 2).

[Noise Suppressing Structure]

The noise suppressing structure 30 has a dash panel 32, an instrument panel 34, and a sound insulating member 36.

<Dash Panel>

The dash panel 32 structures the front portion of the passenger compartment 14. The instrument panel 34 that is described later is provided at the vehicle rear side of the dash panel 32. The dash panel 32 has an inclined portion 32A that extends obliquely upward from the front end portion of the floor panel 16, and a vertical wall portion 32B that extends toward the upper side along the vehicle vertical direction from the upper end portion of the inclined portion 32A, when seen from the vehicle transverse direction. Further, the dash panel 32 separates the power unit chamber 12 and the passenger compartment 14 in the vehicle longitudinal direction. Note that the dash panel 32 has a mounted-to surface 35 that is an example of the rear surface that is the surface at the vehicle rear side.

Figure 4:
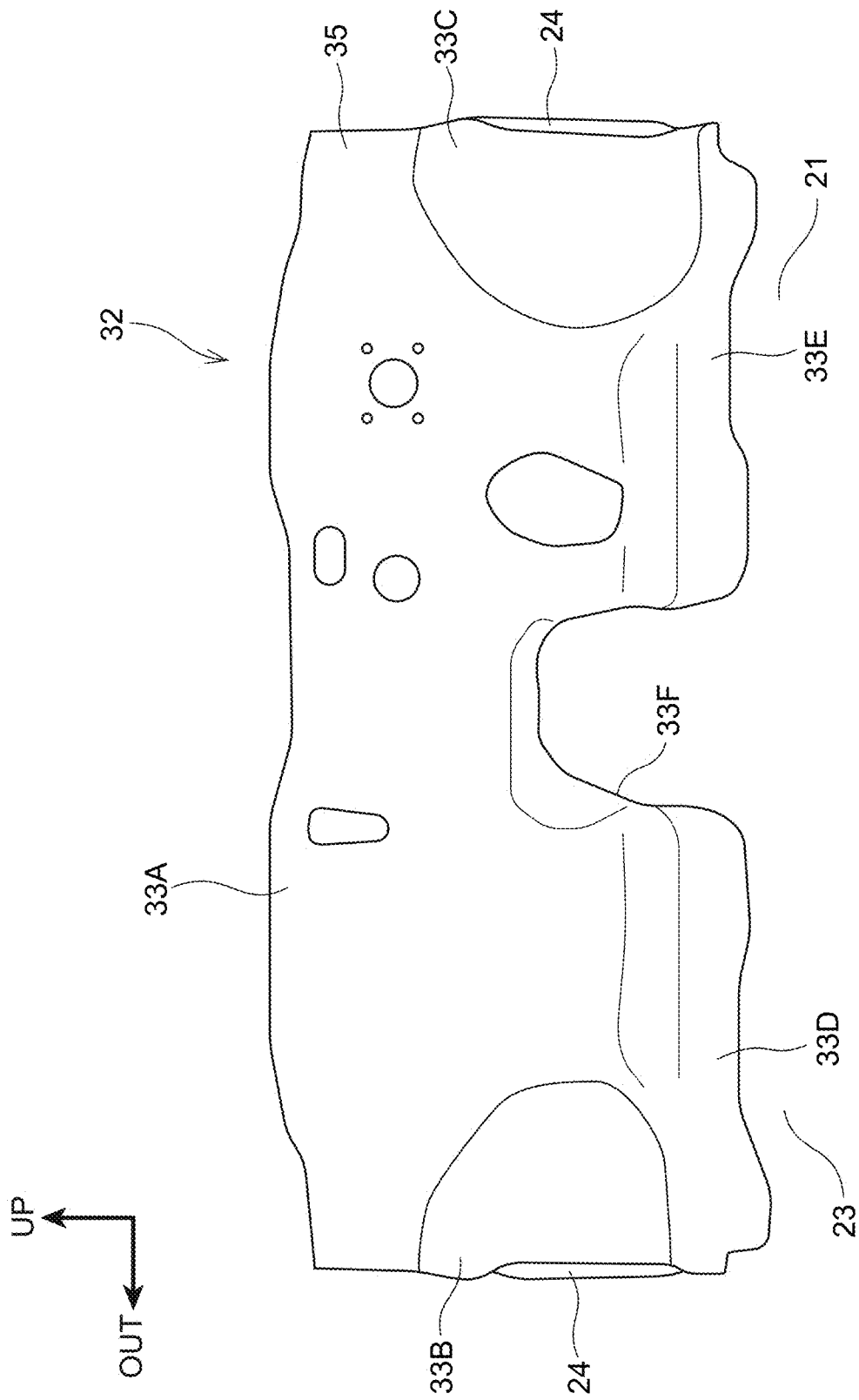
FIG. 4 is a front view in which the dash panel relating to the first embodiment is seen from the vehicle rear side.

The dash panel 32 shown in FIG. 4 is formed by a steel plate being press-molded. Further, as seen from the vehicle rear side, the dash panel 32 is structured to include a top wall portion 33A, left and right side portions 33B, 33C, and left and right lower wall portions 33D, 33E. The top wall portion 33A structures the vehicle upper side portion of the dash panel 32, and extends to a predetermined height with the vehicle longitudinal direction being the plate thickness direction thereof.

The side portion 33B at the left structures the portion at a vehicle transverse direction another side (the front passenger's seat 23 side) of the dash panel 32, and bulges-out toward the vehicle rear side. The side portion 33B at the left structures a portion of a wheel house 24 in which a front wheel 13 (see FIG. 1) of the vehicle 10 is housed. The side portion 33C at the right structures the portion at a vehicle transverse direction one side (the driver's seat 21 side) of the dash panel 32, and bulges-out toward the vehicle rear side. Note that the side portion 33C at the right is structured so as to have left-right symmetry with respect to the side portion 33B at the left, across the vehicle transverse direction center of the vehicle 10.

The lower wall portion 33D at the left extends-out toward the vehicle rear and lower side from further toward the vehicle lower side than the top wall portion 33A, and is connected to the side portion 33B at the left. The lower wall portion 33E at the right extends-out toward the vehicle rear and lower side from further toward the vehicle lower side than the top wall portion 33A, and is connected to the side portion 33C at the right. The lower wall portion 33D at the left and the lower wall portion 33DE at the right are disposed so as to be apart in the vehicle transverse direction. Due thereto, a cut-out portion 33F that opens toward the vehicle lower side is formed in the lower portion of the vehicle transverse direction center of the dash panel 32. The unillustrated floor tunnel is connected to the cut-out portion 33F.

Figure 3:
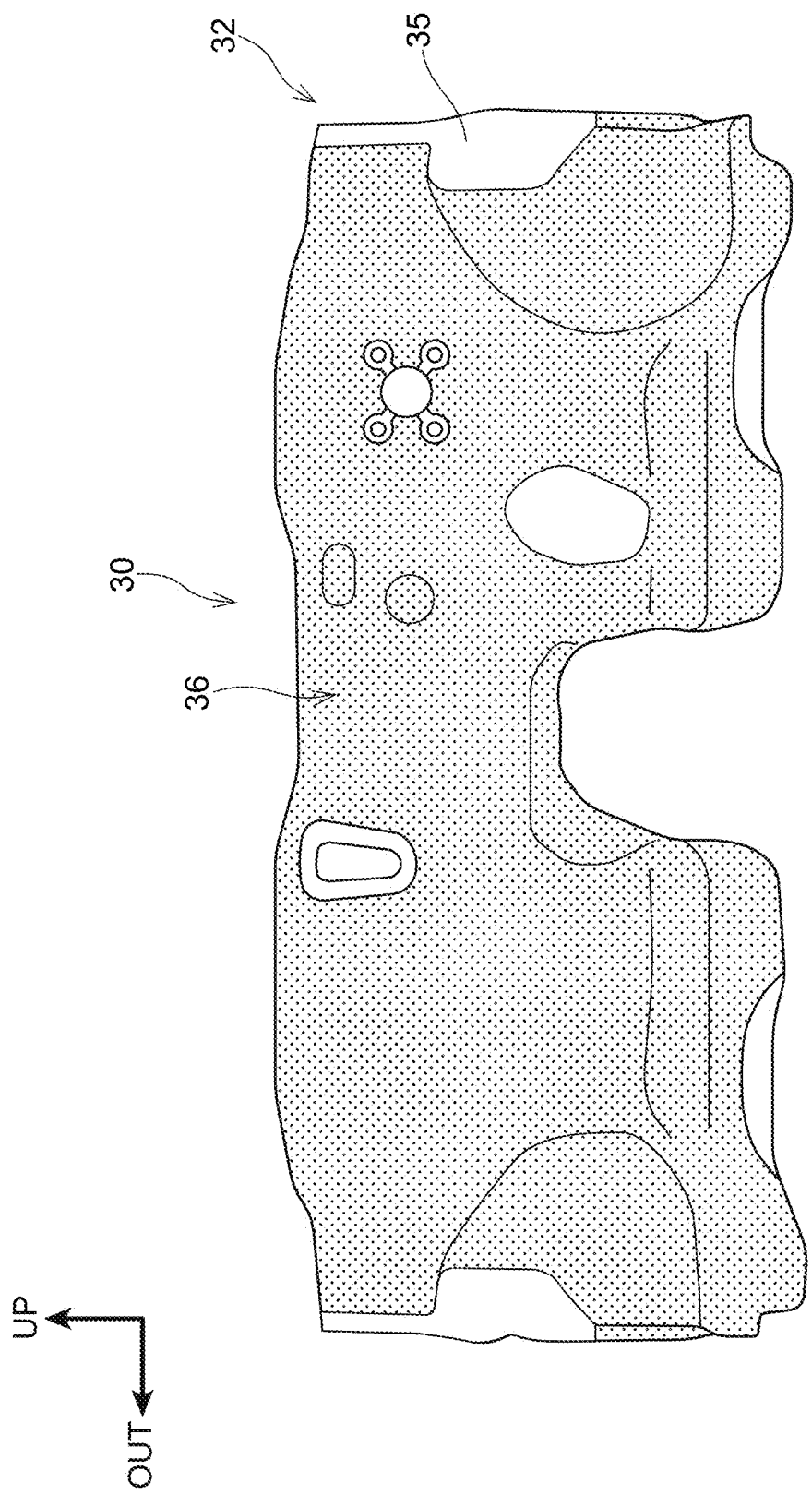
FIG. 3 is a front view in which a dash panel, to which a sound insulating member relating to the first embodiment is mounted, is seen from the vehicle rear side.

As shown in FIG. 3, the sound insulating member 36 is mounted to the mounted-to surface 35 of the dash panel 32. Note that details of the sound insulating member 36 are described later.

Figure 2:
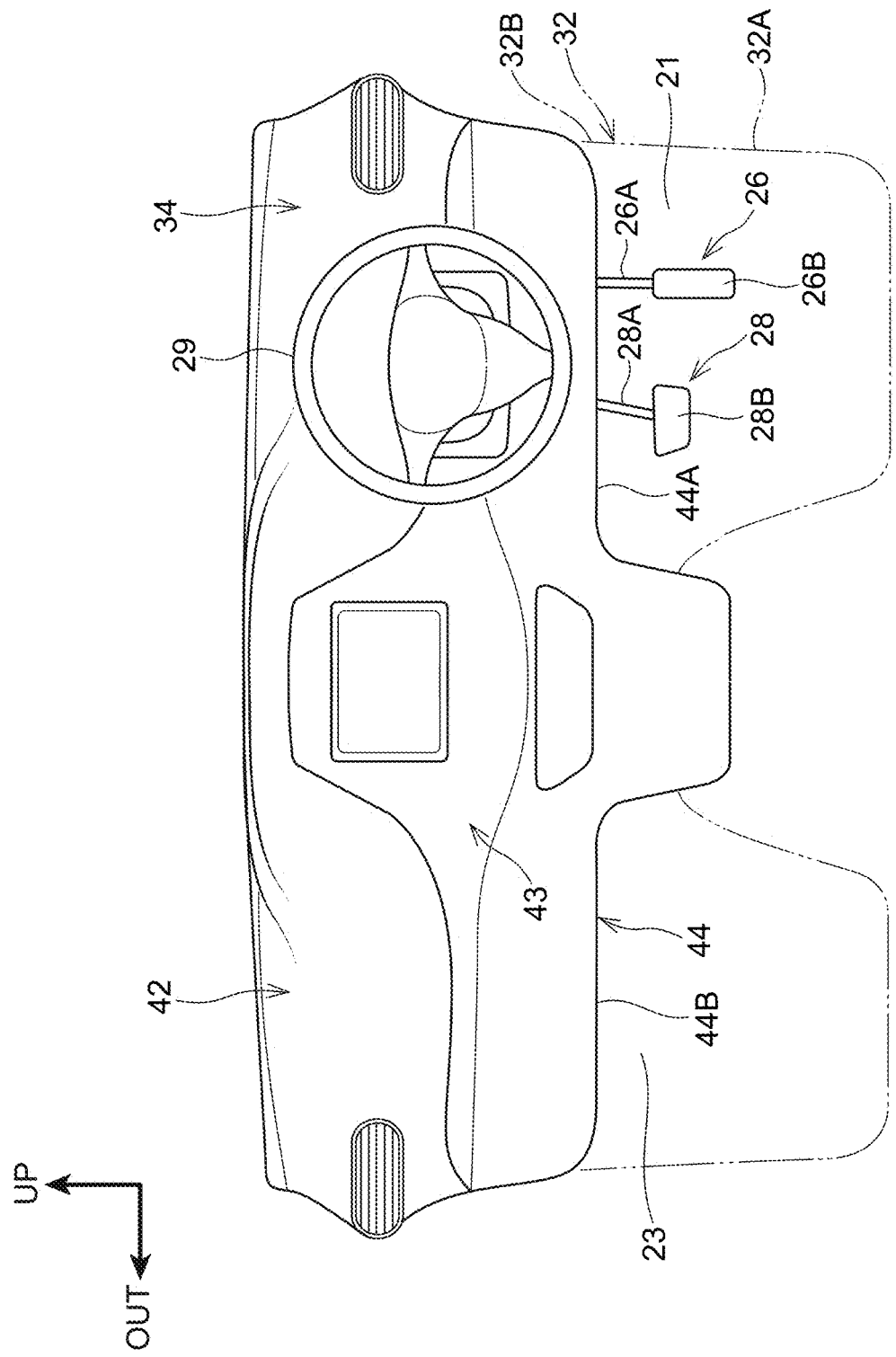
FIG. 2 is a front view in which an instrument panel at a passenger compartment relating to the first embodiment is seen from a vehicle rear side.

An accelerator pedal 26 and a brake pedal 28 are provided at the driver's seat 21 side portion of the dash panel 32 shown in FIG. 2. The accelerator pedal 26 hangs downward from a housing 25A (see FIG. 5) that is mounted to the dash panel 32. The brake pedal 28 hangs downward from a housing 25B (see FIG. 5) that is mounted to the dash panel 32. The accelerator pedal 26 has an arm portion 26A that extends toward the lower side from the housing 25A, and a pedal portion 26B that is mounted to the arm portion 26A. The brake pedal 28 has an arm portion 28A that extends toward the lower side from the housing 25B, and a pedal portion 28B that is mounted to the arm portion 28A.

<Instrument Panel>

The instrument panel 34 structures a portion of the interior members of the vehicle 10. The instrument panel 34 covers the vertical wall portion 32B of the dash panel 32 from the vehicle rear side. An unillustrated connecting column for steering extends-out obliquely upward and rearward from the lower portion of the vehicle transverse direction center at the driver's seat 21 side of the instrument panel 34. A steering wheel 29 is provided at the rear end portion of this connecting column for steering.

Moreover, the instrument panel 34 is structured to include a top wall portion 42 that extends in the vehicle transverse direction and the vehicle longitudinal direction, a rear wall portion 43 that extends toward the lower side from the vehicle longitudinal direction rear end portion of the top wall portion 42, and a lower wall portion 44 that extends-out toward the vehicle front side from the lower end of the rear wall portion 43. The lower wall portion 44 structures the vehicle vertical direction lower end portion of the instrument panel 34. Further, the lower wall portion 44 has a first lower wall 44A that is at the driver's seat 21 side, and a second lower wall 44B that is at the front passenger's seat 23 side.

Figure 5:
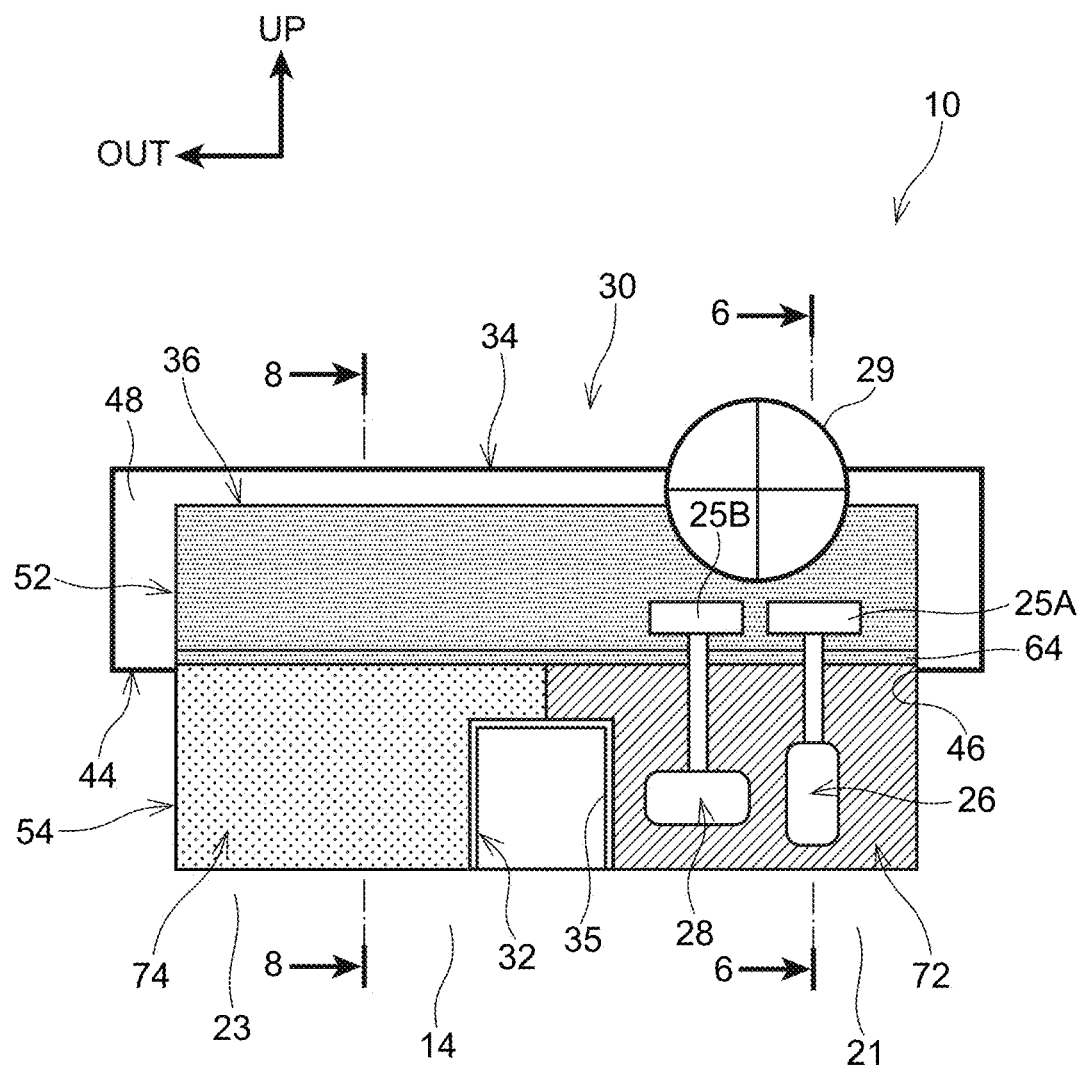
FIG. 5 is an explanatory drawing that schematically shows a state in which a portion of a vehicle front side at the passenger compartment relating to the first embodiment is seen from the vehicle rear side.
Figure 6:
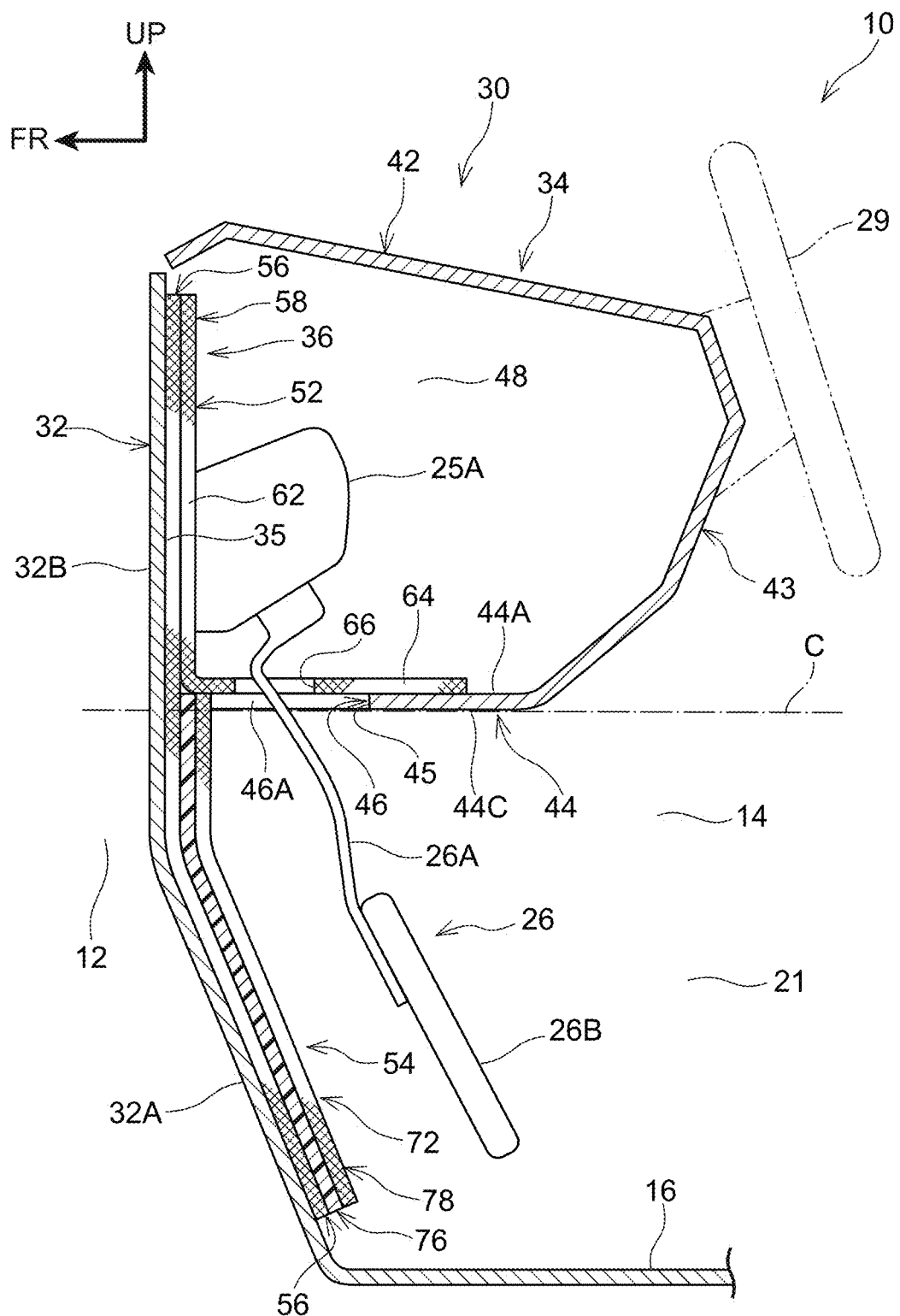
FIG. 6 is a vertical sectional view (a cross-sectional view along line 6-6 of FIG. 5) in a case in which a portion, which is at the vehicle front side and a driver's seat side, of the passenger compartment relating to the first embodiment is seen from a vehicle transverse direction.

As shown in FIG. 6, an opening portion 46 is formed by a front end surface 45 of the lower wall portion 44 and the dash panel 32. The opening portion 46 opens in the vehicle vertical direction. The opening portion 46 communicates the passenger compartment 14 and a space portion 48 that is between the dash panel 32 and the instrument panel 34. Note that, in the following explanation, the opening portion 46 that is at the driver's seat 21 side is called a first opening portion 46A, and the opening portion 46 that is at the front passenger's seat 23 (see FIG. 8) side is called a second opening portion 46B (see FIG. 8). The housing 25A and the housing 25B (see FIG. 5) are disposed at the space portion 48.

The arm portion 26A and the arm portion 28A (see FIG. 2) are inserted through the first opening portion 46A in the vehicle vertical direction so as to be able to move in the vehicle longitudinal direction. In other words, the width of the first opening portion 46A in the vehicle longitudinal direction is set to a size that does not restrict movement of the arm portion 26A and the arm portion 28A.

Figure 8:
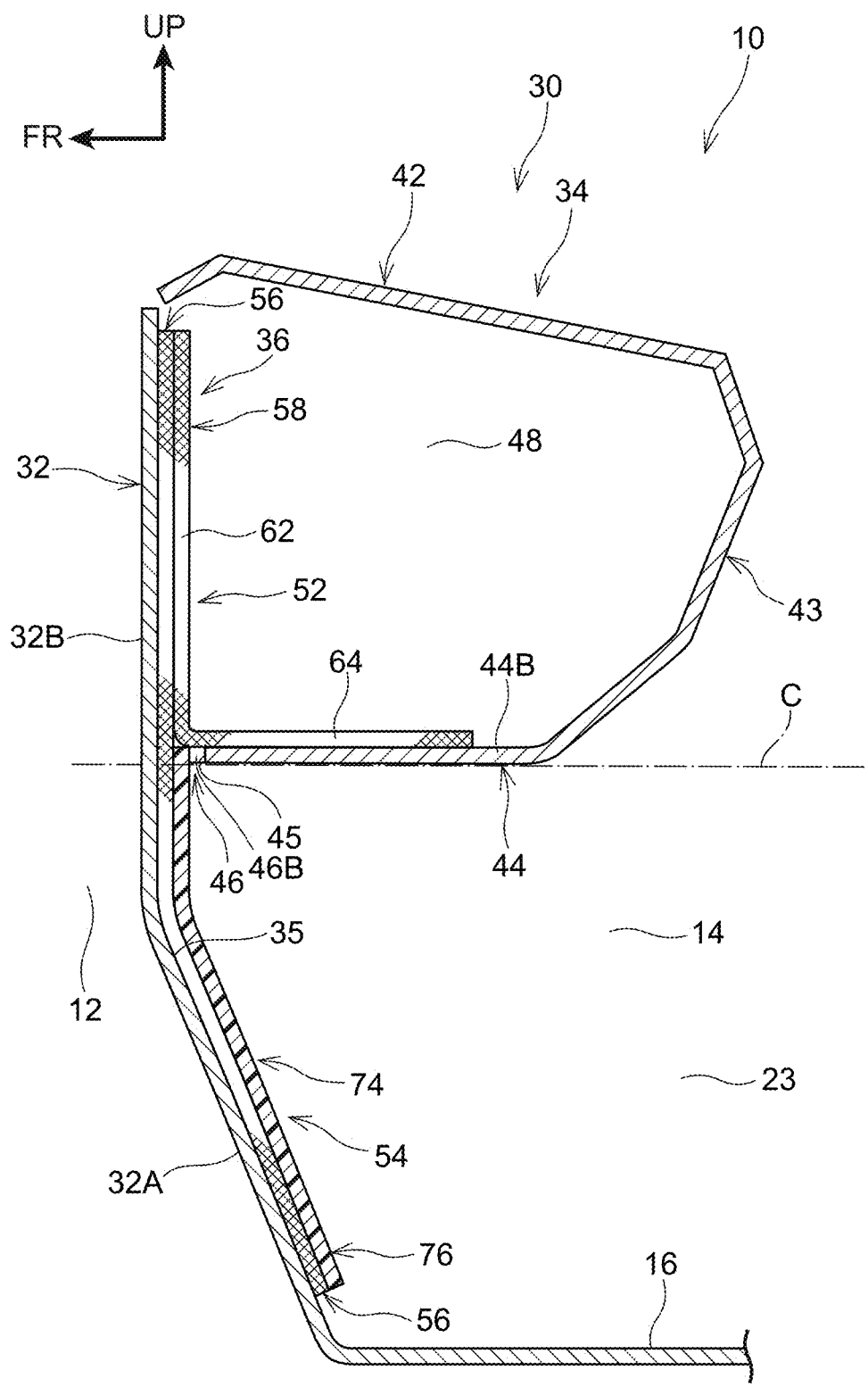
FIG. 8 is a vertical sectional view (a cross-sectional view along line 8-8 of FIG. 5) in a case in which a portion, which is at the vehicle front side and a front passenger's seat side, of the passenger compartment relating to the first embodiment is seen from the vehicle transverse direction.

The width, in the vehicle longitudinal direction, of the second opening portion 46B that is shown in FIG. 8 is more narrow than the width, in the vehicle longitudinal direction, of the first opening portion 46A (see FIG. 6), and is around 5 mm as an example. Namely, the size of the second opening portion 46B is small as compared with the size of the first opening portion 46A. Note that, at the front passenger's seat 23 side, an unillustrated air conditioning unit is provided at the space portion 48.

<Sound Insulating Member>

A state in which the sound insulating member 36 is viewed from the vehicle rear side through the instrument panel 34 is schematically shown in FIG. 5. The sound insulating member 36 is mounted to the mounted-to surface 35 of the dash panel 32, and is a member that functions as a dash inner silencer. Note that an unillustrated dash outer silencer is mounted to the power unit chamber 12 (see FIG. 1) side of the dash panel 32.

The sound insulating member 36 has, as an example, an upper side suppressing portion 52 that is disposed further toward the vehicle upper side than the lower wall portion 44, and a lower side suppressing portion 54 that is disposed further toward the vehicle lower side than the lower wall portion 44. The sound insulating member 36 is disposed so as to cover the opening portion 46, and functions to suppress noise, which is transmitted to the passenger compartment 14, by a dispersing effect, an expending effect, and the like that are described later.

(Upper Side Suppressing Portion)

As shown in FIG. 6, the upper side suppressing portion 52 has a first sound absorbing member 56 that serves as an example of a base portion, and a second sound absorbing member 58 that serves as an example of a cover portion. The structure of the upper side suppressing portion 52 is a two-layer structure in which the first sound absorbing member 56 and the second sound absorbing member 58 are superposed in that order from the dash panel 32 side. Note that the upper side suppressing portion 52 has a similar structure at the driver's seat 21 side and the front passenger's seat 23 (see FIG. 2) side, except for slits 66 that are described later. Further, the upper side suppressing portion 52 is disposed further toward the vehicle upper side than an imaginary line C that indicates the height, in the vehicle vertical direction, of a bottom surface 44C of the lower wall portion 44.

The first sound absorbing member 56 is structured by a felt material (a non-woven fabric) that is plate-shaped and is formed by an elastically deformable fiber material being compressed. Further, the first sound absorbing member 56 is formed to a size and a shape that are such that it can be disposed over substantially the entire mounted-to surface 35 of the dash panel 32. The first sound absorbing member 56 is mounted to the mounted-to surface 35 of the inclined portion 32A and the vertical wall portion 32B by using an adhesive. Namely, the first sound absorbing member 56 of the upper side suppressing portion 52 is, as an example, made integral with the first sound absorbing member 56 of the lower side suppressing portion 54 that is described later.

The second sound absorbing member 58 is structured by a felt material (a non-woven fabric) that is plate-shaped and is formed by an elastically deformable fiber material being compressed. The second sound absorbing member 58 is superposed on the first sound absorbing member 56 from the vehicle rear side, and is fixed thereto by an adhesive. The density of the second sound absorbing member 58 (the area density that is expressed by the mass per unit surface area) is set to be, as an example, about the same as the density of the first sound absorbing member 56.

Concretely, the second sound absorbing member 58 has a vertical plate portion 62 that is fixed to the first sound absorbing member 56, and a lateral plate portion 64 that extends toward the vehicle rear side from the lower end portion of the vertical plate portion 62. The cross-sectional shape when the second sound absorbing member 58 is viewed from the vehicle transverse direction is substantially L-shaped. The shape and the size of the lateral plate portion 64 are made to be a shape and a size such that the lateral plate portion 64 can cover the first opening portion 46A from above. Namely, the lateral plate portion 64 extends in the vehicle longitudinal direction from the lower end portion of the vertical plate portion 62 to the top surface of the first lower wall 44A, and, when viewed from the vehicle vertical direction, covers the first opening portion 46A from the vehicle upper side. Moreover, a portion of the vehicle rear side of the lateral plate portion 64 contacts the top surface of the first lower wall 44A.

Figure 7:
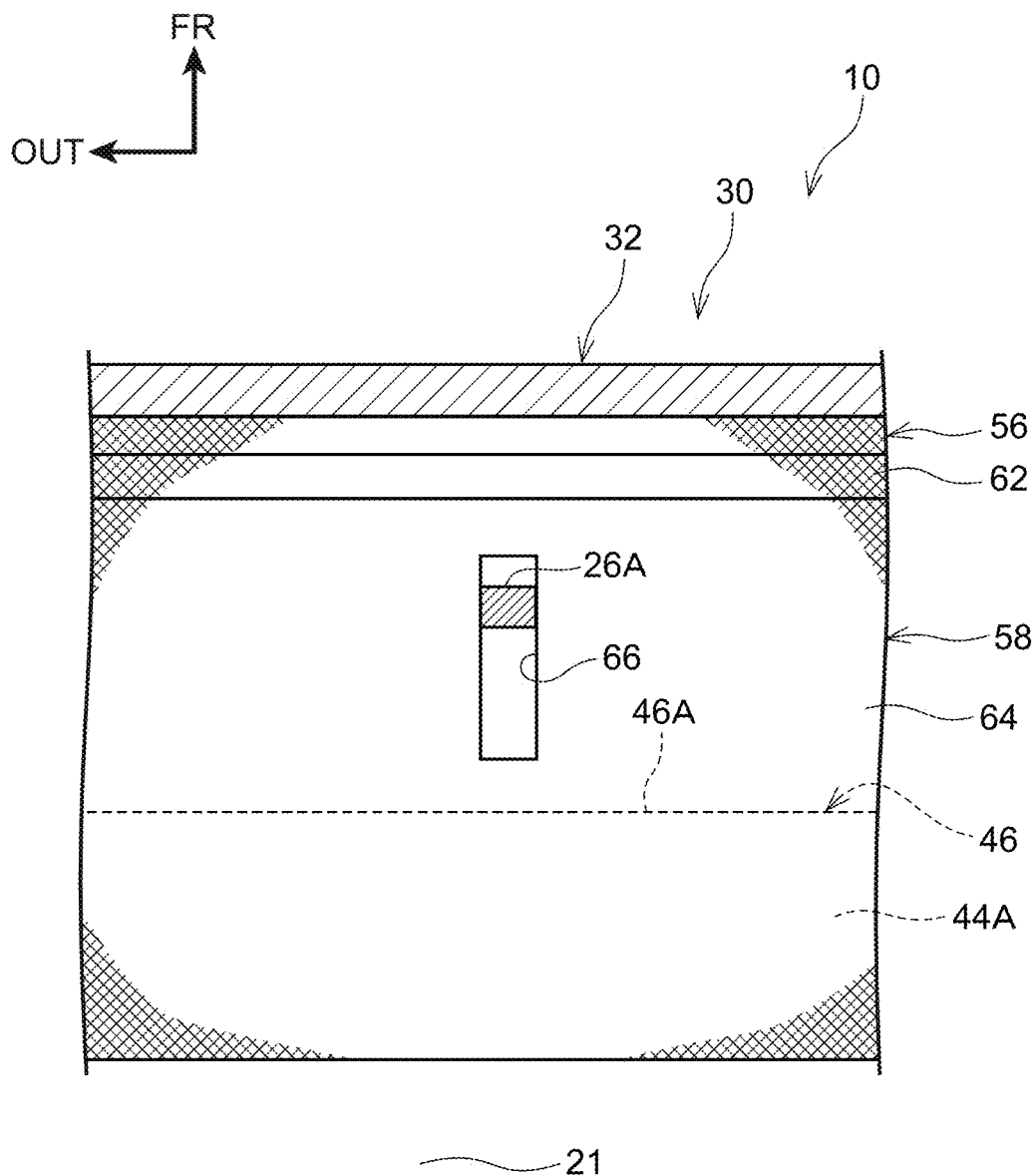
FIG. 7 is an explanatory drawing showing a slit of the sound insulating member relating to the first embodiment.

As shown in FIG. 7, when the lateral plate portion 64 is viewed from the vehicle upper side, the slit 66 is formed in a portion of the lateral plate portion 64, which portion is at the driver's seat 21 side and corresponds to the first opening portion 46A. Note that, in FIG. 7, the slit 66 is illustrated in a manner in which it is enlarged in the vertical longitudinal direction and the vehicle transverse direction, in order to make the structure of the slit 66 easy to understand. Further, although two of the slits 66 are formed in the lateral plate portion 64, in FIG. 7, one of the slits 66 is illustrated, and illustration of the other slit 66 is omitted.

When viewed from the vehicle upper side, the slits 66 are formed in rectangular shapes whose length directions are the vehicle longitudinal direction and whose short-side directions are the vehicle transverse direction. Further, the slits 66 pass through the lateral plate portion 64 in the vehicle vertical direction. The arm portion 26A is inserted through the slit 66 in the vehicle vertical direction. The arm portion 28A (see FIG. 2) is inserted through the other slit 66 in the vehicle vertical direction. The lengths, in the vehicle longitudinal direction, of the slits 66 are set in accordance with the lengths, in the vehicle longitudinal direction, of the ranges of movement of the arm portion 26A and the arm portion 28A.

Here, when the arm portion 26A and the arm portion 28A are moved in the vehicle longitudinal direction, the arm portion 26A and the arm portion 28A slightly contact the inner wall surfaces of the slits 66. However, because the lateral plate portion 64 hangs-down due to its own weight and is set on the first lower wall 44A, even if the arm portion 26A and the arm portion 28A move in the vehicle longitudinal direction, the lateral plate portion 64 is hardly displaced at all. Namely, even in a case in which the arm portion 26A and the arm portion 28A are moved in the vehicle longitudinal direction, the opening portion 46 is covered (closed-off) by the lateral plate portion 64.

As shown in FIG. 8, at the front passenger's seat 23 side, the lateral plate portion 64 extends to the second lower wall 44B. Further, the lateral plate portion 64 covers the second opening portion 46B from the vehicle upper side. In this way, the upper side suppressing portion 52 covers the first opening portion 46A (see FIG. 6) and the second opening portion 46B.

(Lower Side Suppressing Portion)

The lower side suppressing portion 54 that is shown in FIG. 5 has a driver's seat side suppressing portion 72, which structures the region at the driver's seat 21 side with respect to the vehicle transverse direction center of the dash panel 32, and a front passenger's seat side suppressing portion 74, which structures the region at the front passenger's seat 23 side with respect to the vehicle transverse direction center of the dash panel 32. Namely, when viewed from the vehicle rear side, the sound insulating member 36 is structured by three regions (the upper side suppressing portion 52, the driver's seat side suppressing portion 72, and the front passenger's seat side suppressing portion 74) whose layer structures in the vehicle longitudinal direction differ.

The driver's seat side suppressing portion 72 shown in FIG. 6 has the first sound absorbing member 56, a high-density member 76 that serves as an example of the high-density portion, and a third sound absorbing member 78. The structure of the driver's seat side suppressing portion 72 is a three-layer structure in which the first sound absorbing member 56, the high-density member 76 and the third sound absorbing member 78 are superposed in that order from the dash panel 32 side.

The first sound absorbing member 56 at the driver's seat side suppressing portion 72 extends from the imaginary line C to a vicinity of the front end portion of the floor panel 16. The first sound absorbing member 56 at the driver's seat side suppressing portion 72 is superposed, from the vehicle rear side, on the mounted-to surface 35 of the inclined portion 32A and the vertical wall portion 32B, and is mounted thereto by using an adhesive.

The high-density member 76 is structured of a material whose density is higher than that of the materials of the first sound absorbing member 56 and the second sound absorbing member 58, and, as an example, is structured by a resin material that contains an olefin resin. In other words, the high-density member 76 has a higher density that the densities of the first sound absorbing member 56 and the second sound absorbing member 58. Further, the high-density member 76 is mounted to the first sound absorbing member 56 by using an adhesive, from the vehicle rear side and at further toward the vehicle lower side than the lower wall portion 44 (the opening portion 46). Moreover, the high-density member 76 extends from the lower end of the vertical plate portion 62 to the lower end of the first sound absorbing member 56. The upper end of the high-density member 76 is disposed within the first opening portion 46A, at further toward the upper side than the imaginary line C, and contacts the lateral plate portion 64 of the second sound absorbing member 58. In other words, the high-density member 76 supports the lateral plate portion 64.

The third sound absorbing member 78 extends from the lower surface at the vehicle front side of the lateral plate portion 64, to a vicinity of the front end portion of the floor panel 16. The third sound absorbing member 78 is superposed on the high-density member 76 from the vehicle rear side, and is mounted thereto by using an adhesive. The density of the third sound absorbing member 78 is set to be, as an example, about the same as the density of the second sound absorbing member 58. Note that the third sound absorbing member 78 structures the design surface of the driver's seat side suppressing portion 72. The third sound absorbing member 78 also supports the lateral plate portion 64.

The front passenger's seat side suppressing portion 74 that is shown in FIG. 8 has, as an example, the first sound absorbing member 56 and the high-density member 76. Note that the front passenger's seat side suppressing portion 74 does not have the third sound absorbing member 78 (see FIG. 6). Therefore, the mass of the front passenger's seat side suppressing portion 74 is small as compared with the mass of the driver's seat side suppressing portion 72 (see FIG. 6). In other words, the mass of the portion, which is positioned further toward the front passenger's seat 23 side than the vehicle transverse direction center, of the sound insulating member 36 is small as compared with the mass of the portion, which is positioned further toward the driver's seat 21 (see FIG. 6) side than the vehicle transverse direction center, of the sound insulating member 36. The structure of the front passenger's seat side suppressing portion 74 is a two-layer structure in which the first sound absorbing member 56 and the high-density member 76 are superposed in that order from the dash panel 32 side.

The first sound absorbing member 56 at the front passenger's seat side suppressing portion 74 extends from the imaginary line C to a vicinity of the front end portion of the floor panel 16. Further, the first sound absorbing member 56 at the front passenger's seat side suppressing portion 74 is superposed, from the vehicle rear side, on the mounted-to surface 35 of the inclined portion 32A and the vertical wall portion 32B, and is mounted thereto by using an adhesive.

The high-density member 76 is superposed on the first sound absorbing member 56 from the vehicle rear side, and is mounted thereto by using an adhesive. Further, the high-density member 76 extends from the lower end of the vertical plate portion 62 to the lower end of the first sound absorbing member 56. The upper end of the high-density member 76 is disposed in the second opening portion 46B, further toward the upper side than the imaginary line C, and contacts the lateral plate portion 64 of the second sound absorbing member 58. In other words, the high-density member 76 supports the lateral plate portion 64.

Here, the first sound absorbing member 56 (see FIG. 6) of the driver's seat side suppressing portion 72 and the first sound absorbing member 56 of the front passenger's side seat side suppressing portion 74 are made integral. The high-density member 76 (see FIG. 6) at the driver's seat side suppressing portion 72 and the high-density member 76 at the front passenger's seat side suppressing portion 74 are made integral.

At the lower side suppressing portion 54 that is shown in FIG. 6 and FIG. 8, the density of the first sound absorbing member 56 as low as compared with that of the high-density member 76, and therefore, it is easy for the first sound absorbing member 56 to be elastically deformed. On the other hand, because the density of the high-density member 76 is high as compared with that of the first sound absorbing member 56, it is difficult for the high-density member 76 to be elastically deformed. Namely, when the first sound absorbing member 56 and the high-density member 76 are viewed microscopically, it can be considered that a vibration system (a spring-mass system) is structured in which a portion of the first sound absorbing member 56 functions as a spring and a portion of the high-density member 76 functions as a mass.

In the vibration system of the lower side suppressing portion 54, due to the first sound absorbing member 56 being vibrated by noise from the power unit chamber 12, some of the energy of the noise is converted into kinetic energy of the vibration system and is expended. Further, resistance force that is due to the self-weight (gravitational acceleration) and the like of the high-density member 76 works in this vibration system. The vibrations of the vibration system that are due to the energy that the noise has are damped by this resistance force. Namely, at the lower side suppressing portion 54, the sound absorbing performance is high as compared with a structure that does not have a vibration system.

Operation and Effects

Operation and effects of the noise suppressing structure 30 of the first embodiment are described next.

In the noise suppressing structure 30 shown in FIG. 6 and FIG. 8, noise from the power unit chamber 12 side with respect to the dash panel 32 is transmitted to the space portion 48. Due to some of the noise that is transmitted to the space portion 48 being reflected by the instrument panel 34, that noise is transmitted toward the opening portion 46, and that noise is suppressed by the sound insulating member 36.

Concretely, the noise that passes through the sound insulating member 36 is reduced mainly by two effects, as compared with before passing through the sound insulating member 36. One effect is the dispersing effect in which some of the noise is dispersed (included reflected) at the interior of the sound insulating member 36. Another one effect is the expending effect in which some of the energy of the noise is absorbed by the sound insulating member 36 and is expended as kinetic energy for vibrating the sound insulating member 36. Due to these effects, noise that is transmitted from the opening portion 46 to the passenger compartment 14 is reduced as compared with noise in a structure that does not have the sound insulating member 36. Therefore, noise that is transmitted from the opening portion 46 to the passenger compartment 14 can be suppressed.

Further, in the noise suppressing structure 30, the noise that heads from the power unit chamber 12 side toward the space portion 48 is reduced by the dispersing effect, the expending effect, and the like at the first sound absorbing member 56 that is mounted to the dash panel 32. Moreover, the noise, which heads from the space portion 48 through the opening portion 46 toward the passenger compartment 14, is reduced by the dispersing effect, the expending effect, and the like at the second sound absorbing member 58 that covers the opening portion 46. In this way, because noise is reduced in two stages, the noise that is transmitted to the passenger compartment 14 can be suppressed more.

In the noise suppressing structure 30, noise, which heads from the power unit chamber 12 side via the dash panel 32 toward the passenger compartment 14 directly (without going through the space portion 48), exists at further toward the vehicle lower side than the opening portion 46. Here, by making the first sound absorbing member 56, which is elastically deformable, function as a spring, some of the energy of the noise is converted into kinetic energy that elastically deforms the first sound absorbing member 56, and is expended. Moreover, due to the high-density member 76 functioning as a mass, the resistance force that is due to the self-weight (gravitational acceleration) of the high-density member 76 damps vibrations of the first sound absorbing member 56. In this way, because some of the energy of the noise is damped by the first sound absorbing member 56 and the high-density member 76, noise, which heads from the power unit chamber 12 side via the dash panel 32 directly toward the passenger compartment 14, can be suppressed.

Moreover, in the noise suppressing structure 30, due to the high-density member 76 contacting the lateral plate portion 64 of the second sound absorbing member 58, the lateral plate portion 64 is supported by the high-density member 76. Due thereto, deformation of the second sound absorbing member 58 (the lateral plate portion 64) toward the vehicle lower side due to self-weight is suppressed by the reaction force received from the high-density member 76. Therefore, the shape of the second sound absorbing member 58 can be maintained.

In addition, at the noise suppressing structure 30, the size of the second opening portion 46B that is at the front passenger's seat 23 side is small as compared with the size of the first opening portion 46A that is at the driver's seat 21 side. Therefore, the noise, which passes through the second opening portion 46B at the front passenger's seat 23 side from the space portion 48 at the front passenger's seat 23 side, is small as compared with the noise that passes through the first opening portion 46A from the space portion 48 at the driver's seat 21 side. In other words, noise that is transmitted from the second opening portion 46B to the passenger compartment 14 is smaller than noise that is transmitted from the first opening portion 46A to the passenger compartment 14. Here, even if the mass of the sound insulating member 36 that is positioned at the front passenger's seat 23 side is small as compared with the mass of the sound insulating member 36 that is positioned at the driver's seat 21 side, the noise at the front passenger's seat 23 side is small, and therefore, it is difficult for noise to be transmitted to the passenger compartment 14. Namely, at the noise suppressing structure 30, because noise is suppressed without excessively increasing the mass of the sound insulating member 36 at the front passenger's seat 23 side, at the front passenger's seat 23 side, the soundproofing quality becoming excessive can be suppressed.

Second Embodiment

A noise suppressing structure 80, which serves as an example of a structure for suppressing noise into a vehicle passenger compartment relating to a second embodiment, is described next.

Figure 9:
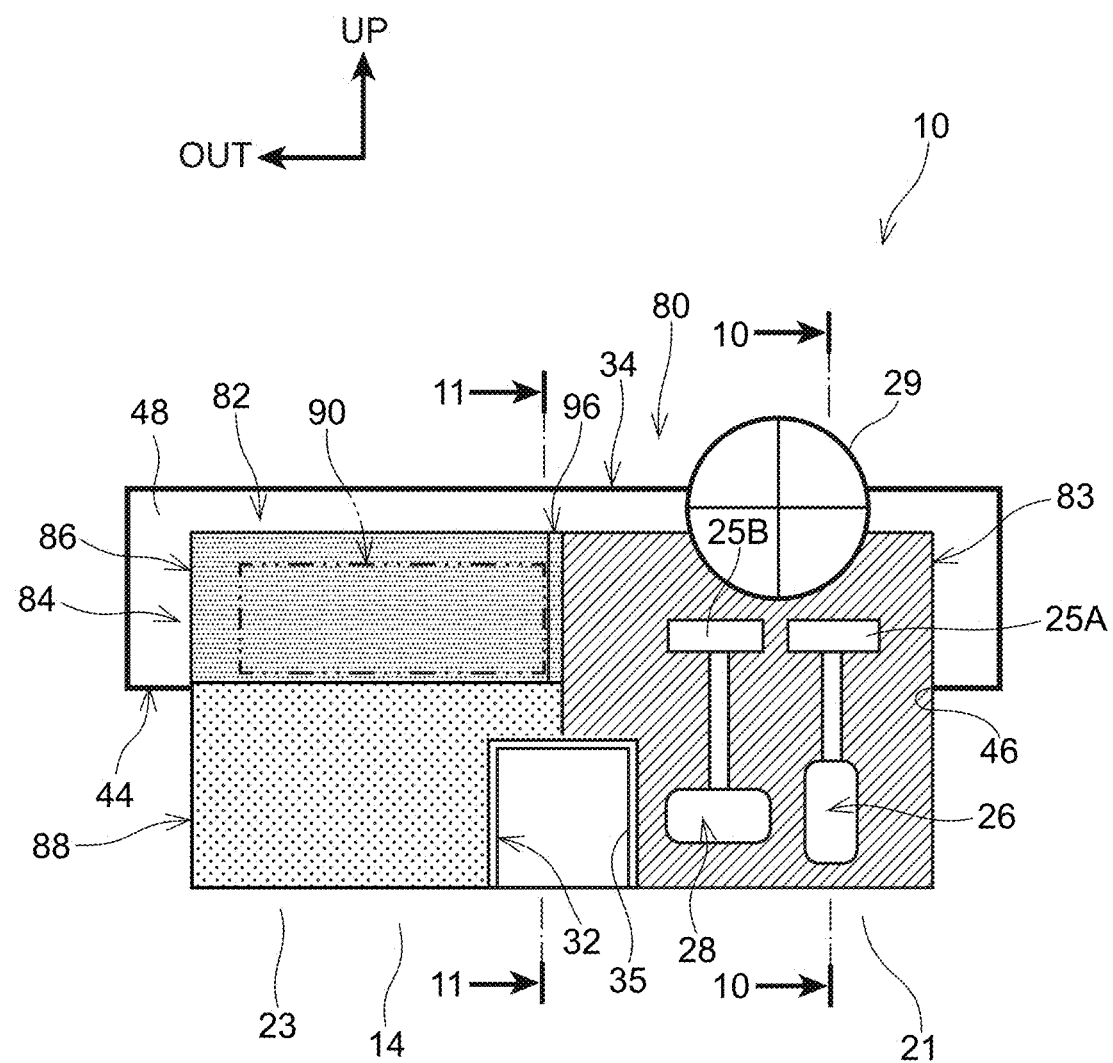
FIG. 9 is an explanatory drawing that schematically shows a state in which a portion of the vehicle front side at a passenger compartment relating to a second embodiment is seen from the vehicle rear side.

The noise suppressing structure 80 that relates to the second embodiment and is shown in FIG. 9, is provided at the vehicle 10 of the first embodiment in place of the noise suppressing structure 30 (see FIG. 1). Further, the structure of the noise suppressing structure 80 is a structure in which a sound insulating member 82 is provided instead of the sound insulating member 36 (see FIG. 1). Structures other than the sound insulating member 82 are structures that are similar to those of the first embodiment. Note that structures that are similar to those of the first embodiment are denoted by the same reference numerals as in the first embodiment, and description thereof is omitted as appropriate.

<Sound Insulating Member>

The sound insulating member 82 is mounted to the mounted-to surface 35 of the dash panel 32, and is a member that functions as a dash inner silencer. Further, the sound insulating member 82 has, as an example, a driver's seat side suppressing portion 83 that is disposed further toward the driver's seat 21 side than the vehicle transverse direction center of the dash panel 32, and a front passenger's seat side suppressing portion 84 that is disposed further toward the front passenger's seat 23 side than that vehicle transverse direction center. Further, the sound insulating member 82 is disposed so as to partition the space portion 48 in the vehicle transverse direction, and functions to suppress, by the dispersing effect, the expending effect and the like, the noise that is transmitted to the passenger compartment 14.

(Driver's Seat Side Suppressing Portion)

Figure 10:
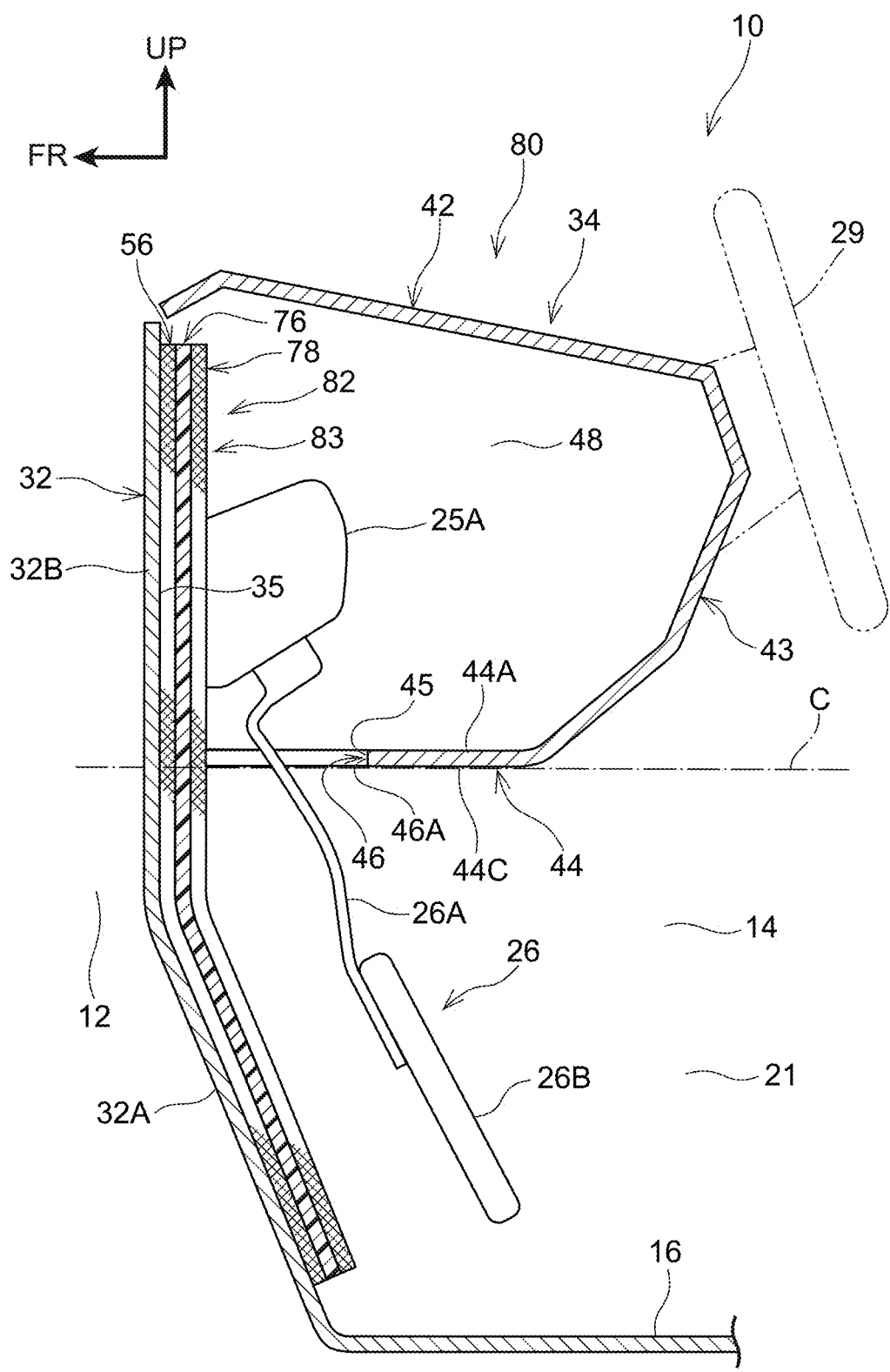
FIG. 10 is a vertical sectional view (a cross-sectional view along line 10-10 of FIG. 9) in a case in which a portion, which is at the vehicle front side and the driver's seat side, of the passenger compartment relating to the second embodiment is seen from the vehicle transverse direction.

As shown in FIG. 10, the driver's seat side suppressing portion 83 has the first sound absorbing member 56, the high-density member 76 and the third sound absorbing member 78. The structure of the driver's seat side suppressing portion 83 is a three-layer structure in which the first sound absorbing member 56, the high-density member 76 and the third sound absorbing member 78 are superposed in that order from the dash panel 32 side.

The first sound absorbing member 56 is disposed over substantially the entire mounted-to surface 35, and is mounted to the mounted-to surface 35 by using an adhesive. The length, in the vehicle vertical direction, of the high-density member 76 is made to be substantially the same as the length, in the vehicle vertical direction, of the first sound absorbing member 56. The high-density member 76 is mounted to the first sound absorbing member 56 from the vehicle rear side by using an adhesive. The length, in the vehicle vertical direction, of the third sound absorbing member 78 is made to be substantially the same as the length, in the vehicle vertical direction, of the high-density member 76. The third sound absorbing member 78 is mounted to the high-density member 76 from the vehicle rear side by using an adhesive.

(Front Passenger's Seat Side Suppressing Portion)

Figure 11:
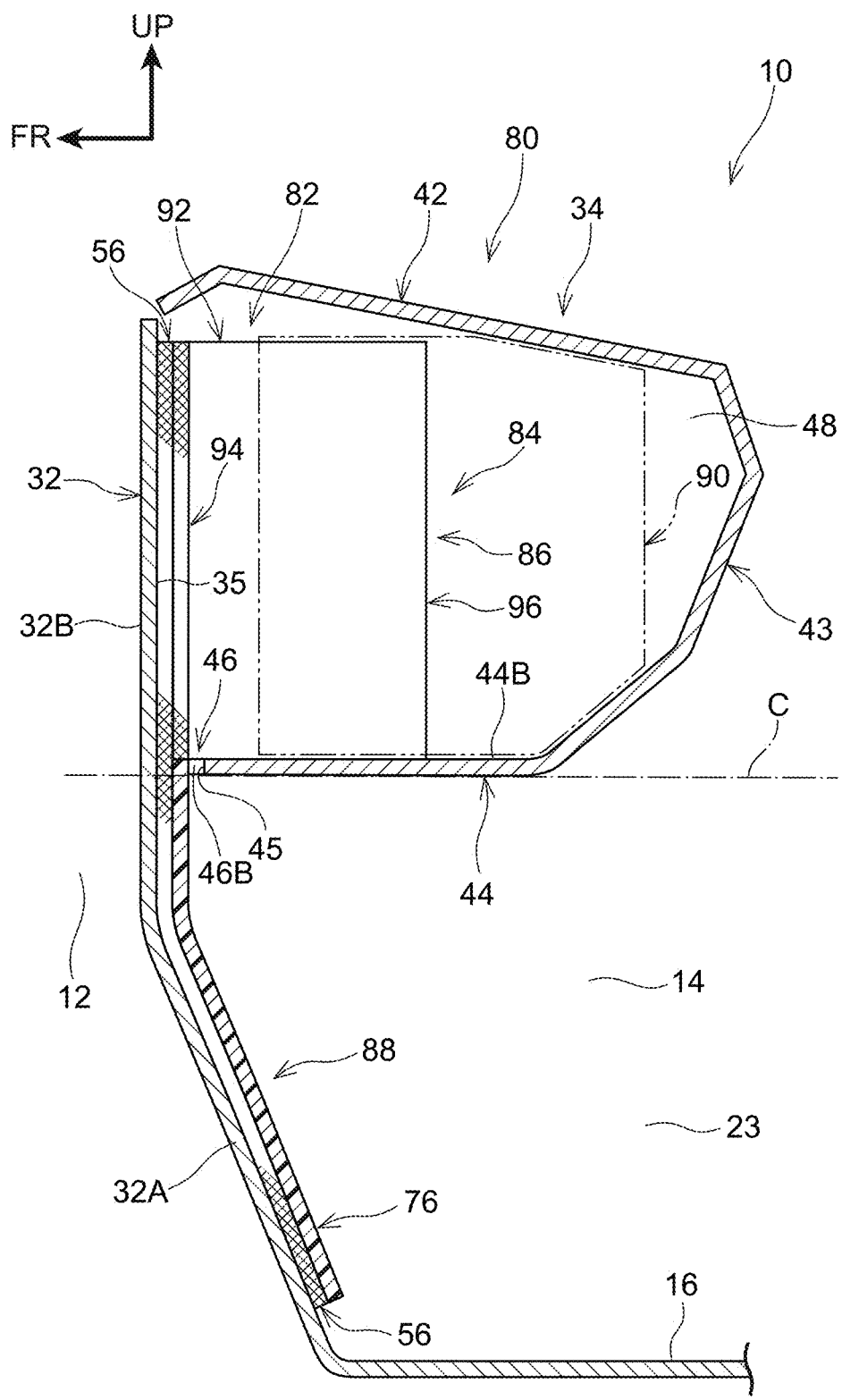
FIG. 11 is a vertical sectional view (a cross-sectional view along line 11-11 of FIG. 9) in a case in which a portion, which is at the vehicle front side and the front passenger's seat side, of the passenger compartment relating to the second embodiment is seen from the vehicle transverse direction.

As shown in FIG. 11, the front passenger's seat side suppressing portion 84 has an upper side suppressing portion 86, which is disposed further toward the vehicle upper side than the lower wall portion 44 (the second opening portion 46B), and a lower side suppressing portion 88, which is disposed further toward the vehicle lower side than the lower wall portion 44. In other words, when viewed from the vehicle rear side, the sound insulating member 82 is structured, as an example, by three regions (the driver's seat side suppressing portion 83, the upper side suppressing portion 86, the lower side suppressing portion 88) whose layer structures in the vehicle longitudinal direction are different. An air conditioning unit 90 is provided at the space portion 48. The air conditioning unit 90 blows air out toward the passenger compartment 14 from unillustrated blower ports that are formed in the instrument panel 34.

The upper side suppressing portion 86 has the first sound absorbing member 56 that serves as an example of the base portion, and a second sound absorbing member 92 that serves as an example of the partitioning portion. The structure of the upper side suppressing portion 86 is a two-layer structure in which the first sound absorbing member 56 and the second sound absorbing member 92 are superposed in that order from the dash panel 32 side. Note that the upper side suppressing portion 86 is disposed further toward the upper side than the imaginary line C.

The second sound absorbing member 92 is structured of a felt material (a non-woven fabric) that is plate-shaped and is formed by an elastically deformable fiber material being compressed. Further, the second sound absorbing member 92 is superposed on the first sound absorbing member 56 from the vehicle rear side, and is fixed thereto by an adhesive. As an example, the density of the second sound absorbing member 92 is set to the same level as the density of the first sound absorbing member 56. Concretely, the second sound absorbing member 92 has a vertical plate portion 94 that is fixed to the first sound absorbing member 56, and a side plate portion 96 that extends toward the vehicle rear side from a vehicle transverse direction one end portion of the vertical plate portion 94 (the end portion at the side near the vehicle transverse direction center of the vehicle 10).

Figure 12:
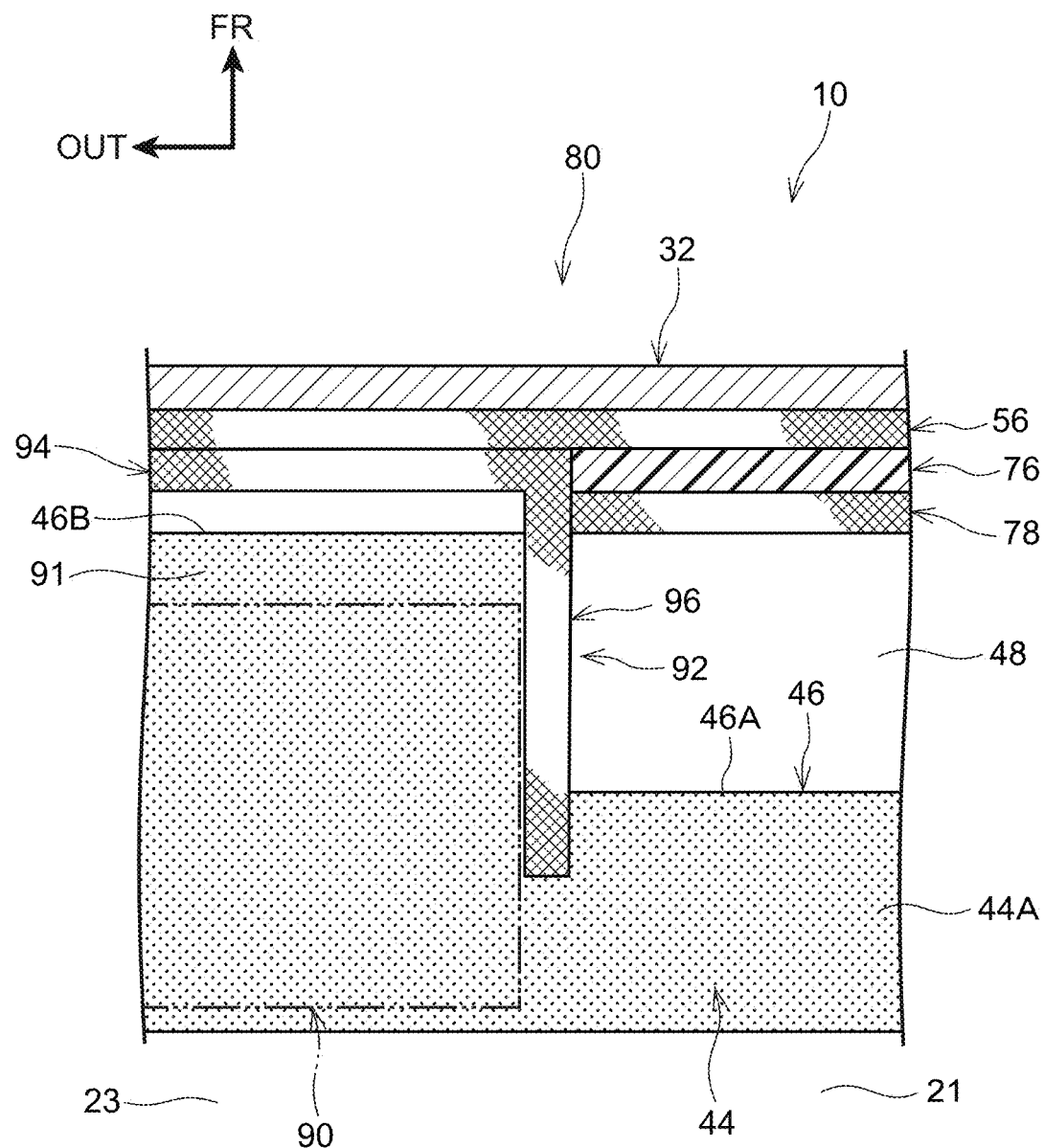
FIG. 12 is an explanatory drawing showing a side plate portion of a sound insulating member relating to the second embodiment, and the peripheral portion of the side plate portion.

As shown in FIG. 12, the cross-sectional shape when the second sound absorbing member 92 is viewed from the vehicle vertical direction is substantially L-shaped. The shape and the size of the side plate portion 96 are made to be a shape and a size that are such that the side plate portion 96 covers a space portion 91 that is between the vertical plate portion 94 and the air conditioning unit 90, when viewed from the vehicle transverse direction. In other words, the side plate portion 96 extends in the vehicle longitudinal direction, from the vehicle transverse direction one end portion of the vertical plate portion 94 to the vehicle longitudinal direction central portion of the side surface of the air conditioning unit 90, with the vehicle transverse direction being the thickness direction of the side plate portion 96.

The bottom surface of the side plate portion 96 contacts the top surface of the lower wall portion 44. Further, the side surface at the vertical plate portion 94 side of the side plate portion 96 contacts the side surface of the air conditioning unit 90. Note that, in FIG. 9 and FIG. 12, the side plate portion 96 and the side surface of the air conditioning unit 90 are illustrated as being apart from one another in the vehicle transverse direction, in order to clearly illustrate the outer shape of the air conditioning unit 90. However, in actuality, the side plate portion 96 and the side surface of the air conditioning unit 90 contact one another.

The side plate portion 96 partitions the space portion 48 into the driver's seat 21 side and the front passenger's seat 23 side. Due thereto, noise that heads from the front passenger's seat 23 side toward the driver's seat 21 side, and noise that heads from the driver's seat 21 side toward the front passenger's seat 23 side, at the space portion 48 is reduced by the side plate portion 96. Concretely, noise, which heads from the space portion 91 at the front passenger's seat 23 side toward the first opening portion 46A at the driver's seat 21 side, and noise, which heads from the space portion 48 at the driver's seat 21 side toward the space portion 91 at the front passenger's seat 23 side, are suppressed by the dispersing effect, the expending effect, and the like of the side plate portion 96.

The lower side suppressing portion 88 that is shown in FIG. 11 has, as an example, the first sound absorbing member 56 and the high-density member 76. The structure of the lower side suppressing portion 88 is a two-layer structure in which the first sound absorbing member 56 and the high-density member 76 are superposed in that order from the dash panel 32 side. Here, the front passenger's seat side suppressing portion 84 does not have the third sound absorbing member 78 (see FIG. 10). Therefore, the mass of the front passenger's seat side suppressing portion 84 is small as compared with the mass of the driver's seat side suppressing portion 83 (see FIG. 10). In other words, the mass of the portion, which is further toward the front passenger's seat 23 side than the vehicle transverse direction center, of the sound insulating member 82 is small as compared with the mass of the portion, which is further toward the driver's seat 21 side than the vehicle transverse direction center, of the sound insulating member 82.

The first sound absorbing member 56 at the lower side suppressing portion 88 extends from the imaginary line C to a vicinity of the front end portion of the floor panel 16.

Further, the first sound absorbing member 56 at the lower side suppressing portion 88 is superposed, from the vehicle rear side, on the mounted-to surface 35 of the inclined portion 32A and the vertical wall portion 32B, and is mounted thereto by using an adhesive.

The high-density member 76 at the lower side suppressing portion 88 is superposed on the first sound absorbing member 56 from the vehicle rear side, and is mounted thereto by using an adhesive. Further, the high-density member 76 at the lower side suppressing portion 88 extends from the lower end of the vertical plate portion 94 to the lower end of the first sound absorbing member 56. The upper end of the high-density member 76 is disposed further toward the upper side than the imaginary line C and so as to face the second opening portion 46B, and contacts the vertical plate portion 94.

Operation and Effects

Operation and effects of the noise suppressing structure 80 of the second embodiment are described next.

At the noise suppressing structure 80 shown in FIG. 10 and FIG. 11, the noise from the power unit chamber 12 side with respect to the dash panel 32 is transmitted to the space portion 48. Due to some of the noise, which is transmitted to the space portion 48, being reflected at the instrument panel 34, that noise is transmitted toward the opening portion 46, and that noise is suppressed by the sound insulating member 82.

Concretely, the noise, which passes through the side plate portion 96 from the front passenger's seat 23 side toward the driver's seat 21 side, and the noise, which passes through the side plate portion 96 from the driver's seat 21 side toward the front passenger's seat 23 side, are reduced by the above-described dispersing effect and expending effect, as compared to before passing through the side plate portion 96. Due to these effects, the noise that is transmitted from the opening portion 46 to the passenger compartment 14 is reduced as compared with noise in a structure that does not have the sound insulating member 82.

Therefore, noise that is transmitted from the opening portion 46 to the passenger compartment 14 can be suppressed.

Further, in the noise suppressing structure 80, the noise, which heads from the power unit chamber 12 side toward the space portion 48, is reduced by the dispersing effect, the expending effect and the like at the first sound absorbing member 56 that is mounted to the dash panel 32. Moreover, as described above, the noise of the space portion 48 is reduced by the dispersing effect, the expending effect, and the like at the side plate portion 96. In this way, noise that heads from the power unit chamber 12 side toward the space portion 48 is reduced, and noise that heads toward the driver's seat 21 side and noise that heads toward the front passenger's seat 23 side at the space portion 48 are reduced. Therefore, the noise that is transmitted from the opening portion 46 to the passenger compartment 14 can be suppressed more.

Moreover, at the noise suppressing structure 80, noise, which heads from the power unit chamber 12 side via the dash panel 32 directly toward the passenger compartment 14, exists at further toward the vehicle lower side than the opening portion 46. Here, as described above, a portion of the energy of the noise is converted into kinetic energy that elastically deforms the first sound absorbing member 56, and is expended. Moreover, the resistance force that is due to the self-weight of the high-density member 76 damps vibrations of the first sound absorbing member 56. In this way, because some of the energy of the noise is damped by the first sound absorbing member 56 and the high-density member 76, noise, which heads from the power unit chamber 12 side via the dash panel 32 directly toward the passenger compartment 14, can be suppressed.

In addition, at the noise suppressing structure 80, even if the mass of the sound insulating member 82 that is positioned at the front passenger's seat 23 side is small as compared with the mass of the sound insulating member 82 that is positioned at the driver's seat 21 side, because the noise that is at the front passenger's seat 23 side is small, it is difficult for noise to be transmitted to the passenger compartment 14. Namely, at the noise suppressing structure 80, noise is suppressed without excessively increasing the mass of the sound insulating member 82 that is positioned at the front passenger's seat 23 side, and therefore, at the front passenger's seat 23 side, the soundproofing quality becoming excessive can be suppressed.

Modified Example

A noise suppressing structure 100, which serves as an example of a structure for suppressing noise into a vehicle passenger compartment and relates to a modified example, is described next.

Figure 13:
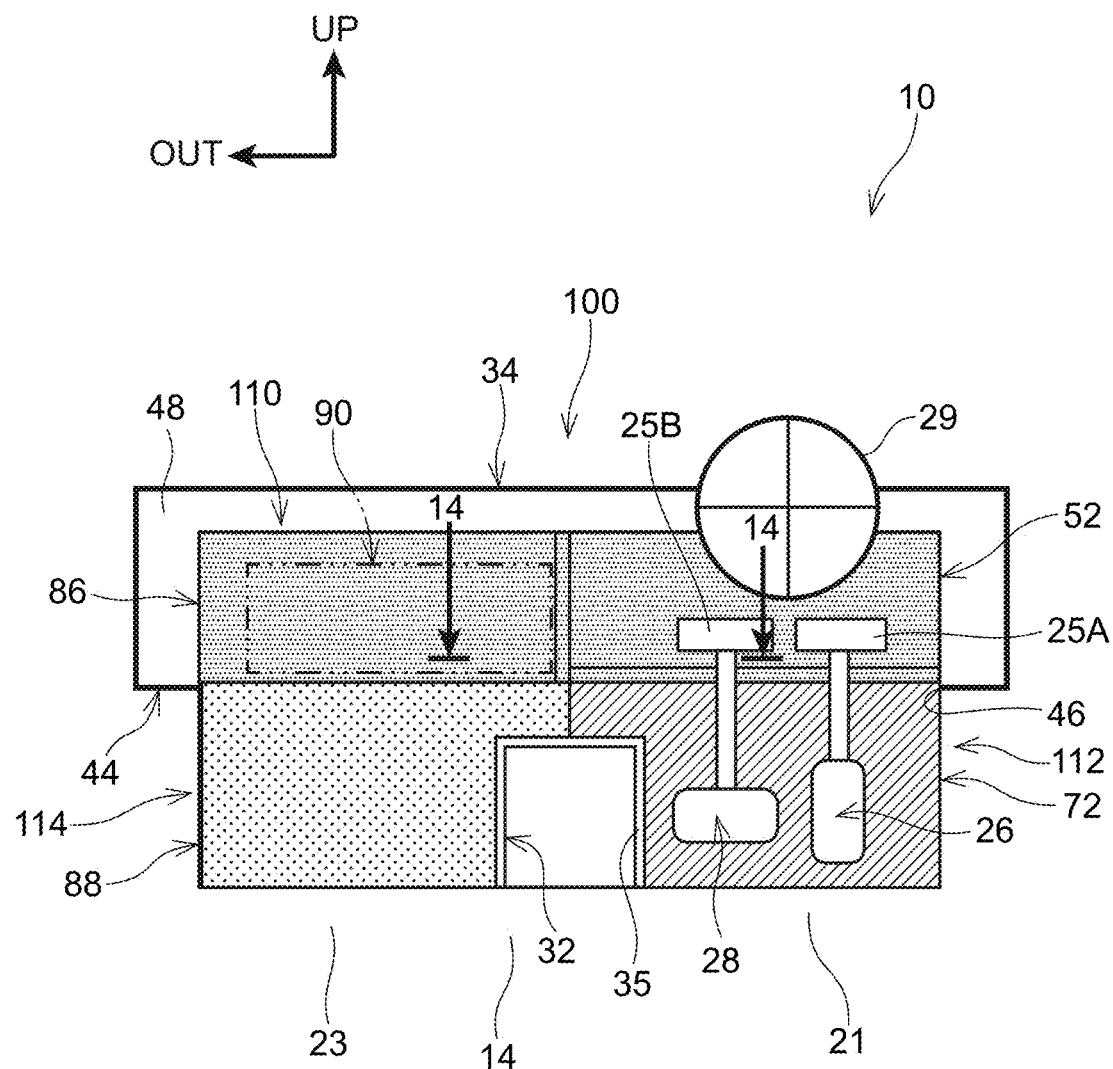
FIG. 13 is an explanatory drawing schematically showing a state in which a portion of the vehicle front side at a passenger compartment relating to a modified example is seen from the vehicle rear side.

The noise suppressing structure 100 relating to the modified example that is shown in FIG. 13 is provided at the vehicle 10 of the first embodiment instead of the noise suppressing structure 30 (see FIG. 1). Further, the structure of the noise suppressing structure 100 is a structure in which a sound insulating member 110 is provided instead of the sound insulating member 36 (see FIG. 1). Structures other than the sound insulating member 110 are structures that are similar to those of the first embodiment. Note that structures that are similar to those of the first embodiment are denoted by the same reference numerals as in the first embodiment, and description thereof is omitted as appropriate.

<Sound Insulating Member>

The sound insulating member 110 is mounted to the mounted-to surface 35 of the dash panel 32, and is a member that functions as a dash inner silencer. Further, the sound insulating member 110 has, as an example, a driver's seat side suppressing portion 112 that is disposed further toward the driver's seat 21 side than the vehicle transverse direction center of the dash panel 32, and a front passenger's seat side suppressing portion 114 that is disposed further toward the front passenger's seat 23 side than that vehicle transverse direction center.

The driver's seat side suppressing portion 112 has the upper side suppressing portion 52 that is disposed further toward the vehicle upper side than the lower wall portion 44, and the driver's seat side suppressing portion 72 that is disposed further toward the vehicle lower side than the lower wall portion 44. In other words, the structure of the driver's seat side suppressing portion 112 is similar to the structure of the driver's seat 21 side of the sound insulating member 36 (see FIG. 5).

The front passenger's seat side suppressing portion 114 has the upper side suppressing portion 86, which is disposed further toward the vehicle upper side than the lower wall portion 44, and the lower side suppressing portion 88, which is disposed further toward the vehicle lower side than the lower wall portion 44. In other words, the front passenger's seat side suppressing portion 114 is similar to the structure of the front passenger's seat side suppressing portion 84 (see FIG. 9). In this way, when viewed from the vehicle rear side, the sound insulating member 110 is structured, as an example, by four regions (the upper side suppressing portion 52, the driver's seat side suppressing portion 72, the upper side suppressing portion 86, the lower side suppressing portion 88) whose layer structures in the vehicle longitudinal direction are different.

Figure 14:
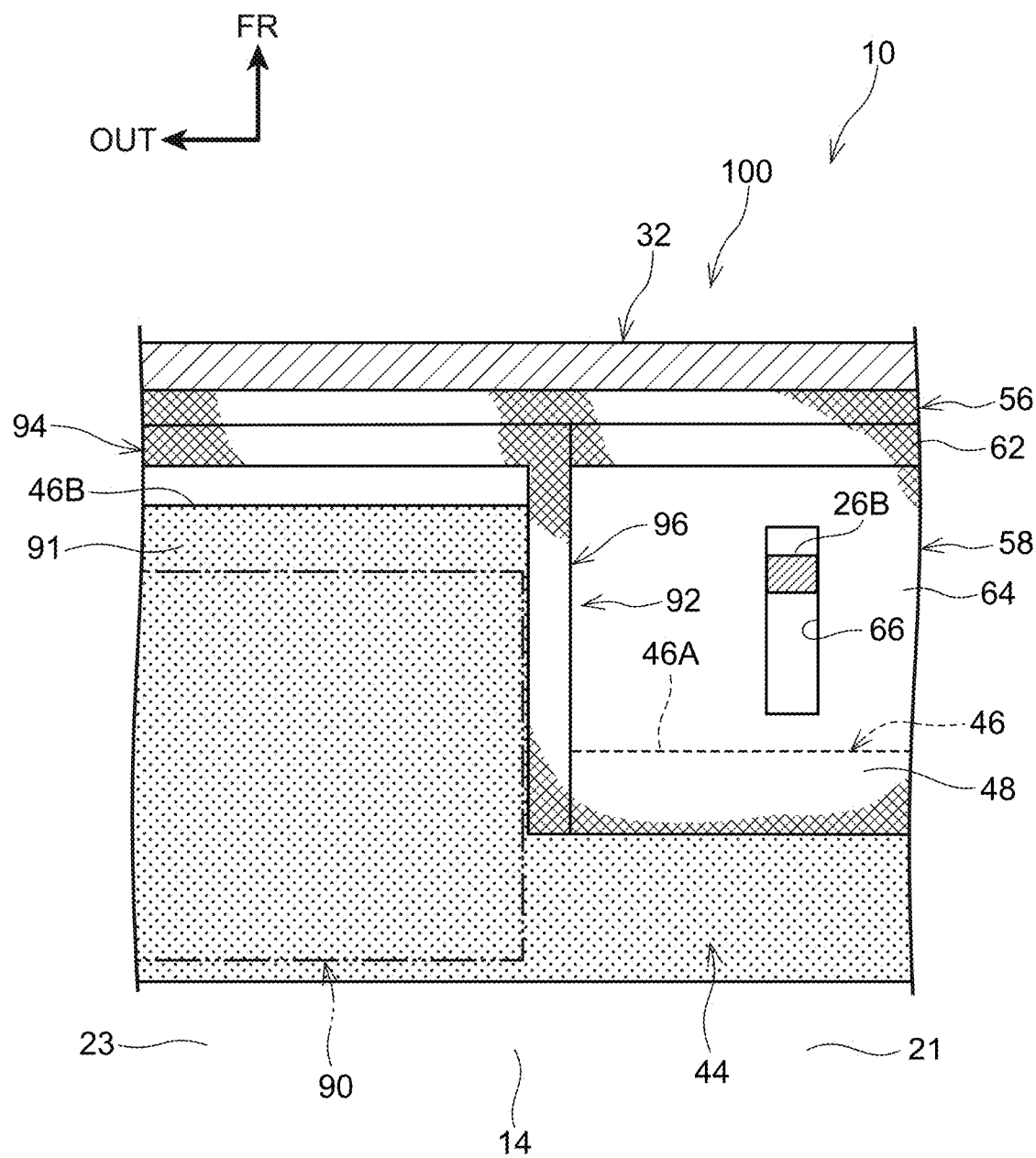
FIG. 14 is an explanatory drawing showing a sound insulating member relating to the modified example.

As shown in FIG. 14, at further toward the driver's seat 21 side than the vehicle transverse direction center of the noise suppressing structure 100, the noise that heads from the space portion 48 toward the passenger compartment 14 is suppressed by the second sound absorbing member 58 that covers the opening portion 46. Further, at further toward the front passenger's seat 23 side than the vehicle transverse direction center of the noise suppressing structure 100, at the space portion 48 and the space portion 91, the noise that heads from the front passenger's seat 23 side toward the driver's seat 21 side, and the noise that heads from the driver's seat 21 side toward the front passenger's seat 23 side, are suppressed by the side plate portion 96 of the second sound absorbing member 92.

In this way, the sound insulating member 110, which combines the sound insulating member 36 of the first embodiment (see FIG. 5) and the sound insulating member 82 of the second embodiment (see FIG. 9), may be used. Note that, in a case in which the sound absorbing member 110 is sectioned up-and-down with the lower wall portion 44 (the opening portion 46) being the boundary, from the standpoint of suppressing noise, it is preferable that the mass of the sound insulating member 110 that is positioned at the vehicle lower side be greater than the mass of the sound insulating member 110 that is positioned at the vehicle upper side. Further, in a case in which the sound insulating member 110 is sectioned into the driver's seat 21 side and the front passenger's seat 23 side with the vehicle transverse direction center of the vehicle being the boundary, from the standpoint of suppressing noise, it is preferable that the mass of the sound insulating member 110 that is positioned at the driver's seat 21 side be greater than the mass of the sound insulating member 110 that is positioned at the front passenger's seat 23 side.

Note that, as shown in FIG. 13 and FIG. 14, the side plate portion 96 and the side surface of the air conditioning unit 90 are illustrated as being apart from one another, in order to clearly illustrate the outer shape of the air conditioning unit 90. However, in actuality, the side plate portion 96 and the side surface of the air conditioning unit 90 contact one another.

Other Modified Examples

In the noise suppressing structure 30, the lateral plate portion 64 may be made integral with the first sound absorbing member 56, without the vertical plate portion 62 being provided. Further, there may be a structure in which the first sound absorbing member 56 that is further toward the vehicle upper side than the lower wall portion 44 is not provided, and the opening portion 46 is covered by the lateral plate portion 64. Moreover, the sound insulating member 36 does not have to have the high-density member 76. In addition, the high-density member 76 does not have to contact the lateral plate portion 64 of the second sound absorbing member 58. Further, the mass of the portion, which is positioned further toward the front passenger's seat 23 side than the vehicle transverse direction center, of the sound insulating member 36 may be the same as the mass of the portion, which is positioned further toward the driver's seat 21 side than the vehicle transverse direction center, of the sound insulating member 36.

The structure of the lateral plate portion 64 is not limited to a single-layer structure, and may be made to be a multi-layer structure. Further, the cross-sectional shape of the second sound absorbing member 58 is not limited to an L-shape when viewed from the vehicle transverse direction, and may be, for example, a U-shape that opens toward the vehicle upper side. Moreover, in the vehicle vertical direction, the height of the lower wall portion 44 may be a height that is lower than the height of the lower end of the vertical plate portion 62, and the lateral plate portion 64 may extend obliquely downward toward the lower wall portion 44. Further, the lateral plate portion 64 may be fixed to the bottom surface of the lower wall portion 44 by using an adhesive.

In the noise suppressing structure 80, the side plate portion 96 may be made integral with the first sound absorbing member 56, without providing the vertical plate portion 94.

Further, there may be a structure in which the first sound absorbing member 56, which is further toward the vehicle upper side than the lower wall portion 44, is not provided, and the space portion 91 is covered by the side plate portion 96. Moreover, the sound insulating member 82 does not have to have the high-density member 76. In addition, the mass of the portion, which is positioned further toward the front passenger's seat 23 side than the vehicle transverse direction center, of the sound insulating member 82 may be the same as the mass of the portion, which is positioned further toward the driver's seat 21 side than the vehicle transverse direction center, of the sound insulating member 82.

The structure of the side plate portion 96 is not limited to a single-layer structure, and may be made to be a multi-layer structure. Further, the structure of the side plate portion 96 is not limited to a structure that has the same thickness as the vertical plate portion 94, and may be a structure whose width in the vehicle transverse direction is wide as compared with the vertical plate portion 94.

Figure 15:
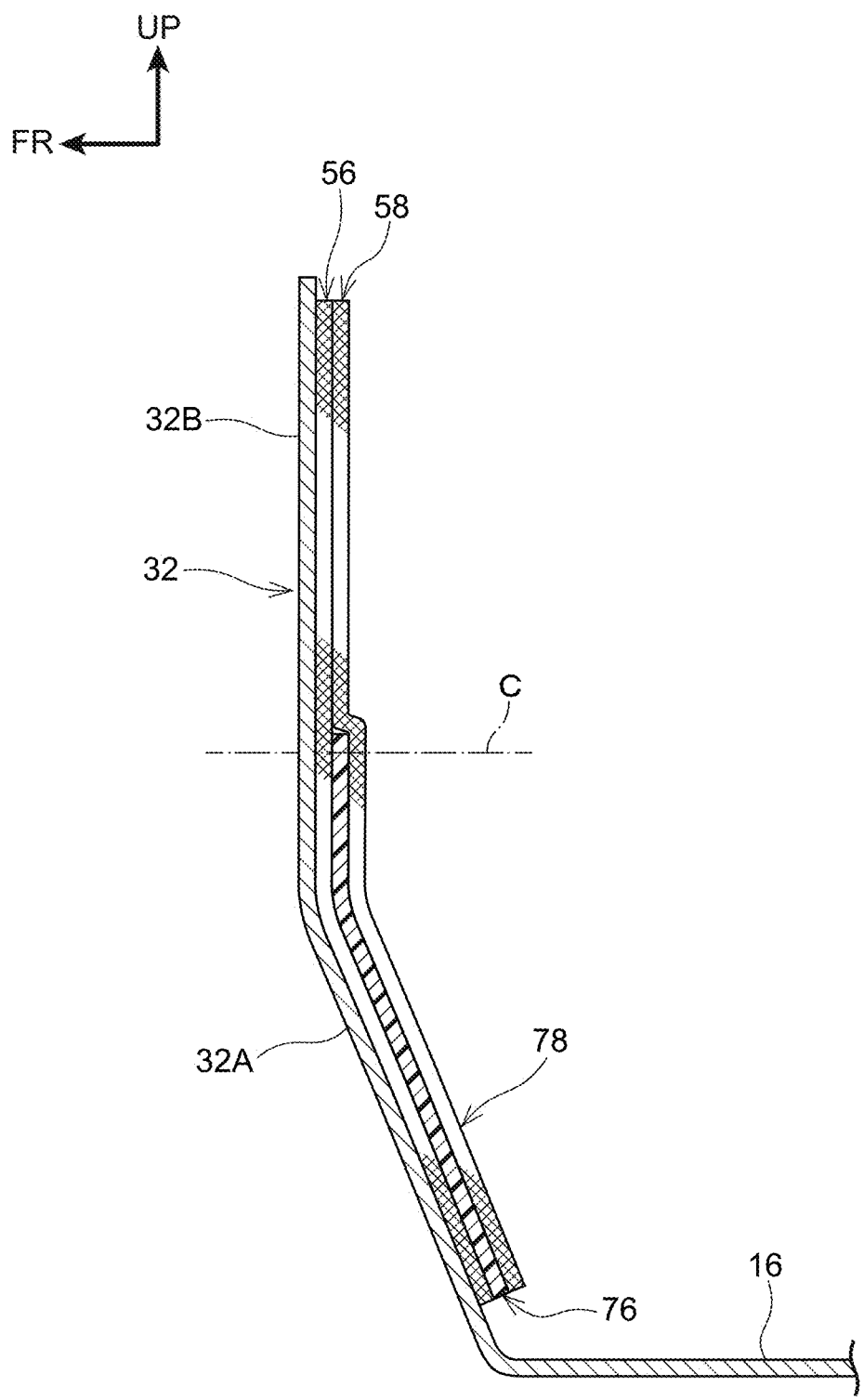
FIG. 15 is an explanatory drawing showing the structure of a sound insulating member relating to another modified example.

As shown in FIG. 15, the second sound absorbing member 58 that is mounted to the first sound absorbing member 56, and the third sound absorbing member 78 that is mounted to the high-density member 76, may be structured of the same material and may be made to be an integral sound absorbing member. Due thereto, because the step portion at the upper end of the high-density member 76 is covered by the sound absorbing member, separation of the high-density member 76 from the first sound absorbing member 56 is suppressed, and the soundproofing performance is improved.

In a case in which the air conditioning unit 90 is provided at the vehicle transverse direction central portion of the vehicle 10, the side plate portion 96 may extend toward the vehicle rear side from a portion of the vertical plate portion 94, so as to contact the side surface, which is at the side far from the driver's seat 21, of the air conditioning unit 90.

The arm portion 26A and the arm portion 28A do not have to contact the inner wall surfaces of the slits 66.

The first sound absorbing member 56, the second sound absorbing member 58 and the second sound absorbing member 92 are not limited to being made of felt, and may be made of urethane.

What is claimed is:

1. A structure for suppressing noise into a vehicle passenger compartment, the structure comprising:
   a dash panel that separates the vehicle passenger compartment and a power unit chamber that is disposed at a vehicle front side;
   an instrument panel that covers the dash panel from a vehicle rear side, and that has a lower wall portion which extends toward a vehicle front side and forms an opening portion with the dash panel; and
   a sound insulating member that is disposed so as to cover the opening portion or is disposed so as to partition a space portion, which is between the dash panel and the instrument panel, in a vehicle transverse direction, wherein the sound insulating member has:
   a base portion that is mounted to a rear surface of the dash panel, and
   a partitioning portion that extends from the base portion toward the vehicle rear side, that contacts the lower wall portion, and that partitions the space portion into a driver's seat side and a front passenger's seat side.

2. The structure for suppressing noise into a vehicle passenger compartment of claim 1, wherein the sound insulating member has:
   a cover portion that extends from the base portion toward the vehicle rear side, that contacts the lower wall portion, and that covers the opening portion.

3. The structure for suppressing noise into a vehicle passenger compartment of claim 2, wherein:
   the base portion is elastically deformable,
   the sound insulating member has a high-density portion having a density higher than a density of the base portion, and
   the high-density portion is mounted to the base portion from the vehicle rear side further toward a vehicle lower side than the opening portion.

4. The structure for suppressing noise into a vehicle passenger compartment of claim 3, wherein the high-density portion contacts the cover portion.

5. The structure for suppressing noise into a vehicle passenger compartment of claim 1, wherein:

a size of the opening portion at a front passenger's seat side is small as compared with a size of the opening portion at a driver's seat side, and a mass of a portion, which is positioned further toward the front passenger's seat side than a vehicle transverse direction center, of the sound insulating member is small as compared with a mass of a portion, which is positioned further toward the driver's seat side than the vehicle transverse direction center, of the sound insulating member.

6. The structure for suppressing noise into a vehicle passenger compartment of claim 3, wherein slits through which arm portions are inserted are formed in the cover portion at positions corresponding to the opening portion at a driver's seat side.

7. A structure for suppressing noise into a vehicle passenger compartment, the structure comprising:
   a dash panel that separates the vehicle passenger compartment and a power unit chamber that is disposed at a vehicle front side;
   an instrument panel that covers the dash panel from a vehicle rear side, and that has a lower wall portion which extends toward a vehicle front side and forms an opening portion with the dash panel; and
   a sound insulating member that is disposed so as to cover the opening portion or is disposed so as to partition a space portion, which is between the dash panel and the instrument panel, in a vehicle transverse direction, wherein the sound insulating member has:
      a base portion that is mounted to a rear surface of the dash panel, and
      a partitioning portion that extends from the base portion toward the vehicle rear side, that contacts the lower wall portion, and that partitions the space portion into a driver's seat side and a front passenger's seat side, wherein:
   the base portion is elastically deformable,
   the sound insulating member has a high-density portion having a density higher than a density of the base portion, and
   the high-density portion is mounted to the base portion from the vehicle rear side further toward a vehicle lower side than the opening portion, wherein
   the sound insulating member has a cover portion that extends from the base portion toward the vehicle rear side, that contacts the lower wall portion, and that covers the opening portion.

8. The structure for suppressing noise into a vehicle passenger compartment of claim 7, wherein the high-density portion contacts the cover portion.

9. The structure for suppressing noise into a vehicle passenger compartment of claim 7, wherein slits through which arm portions are inserted are formed in the cover portion at positions corresponding to the opening portion at a driver's seat side.

10. A structure for suppressing noise into a vehicle passenger compartment, the structure comprising:
    a dash panel that separates the vehicle passenger compartment and a power unit chamber that is disposed at a vehicle front side;
    an instrument panel that covers the dash panel from a vehicle rear side, and that has a lower wall portion which extends toward a vehicle front side and forms an opening portion with the dash panel; and
    a sound insulating member that is disposed so as to cover the opening portion or is disposed so as to partition a space portion, which is between the dash panel and the instrument panel, in a vehicle transverse direction, wherein the sound insulating member has:
       a base portion that is mounted to a rear surface of the dash panel, and
       a partitioning portion that extends from the base portion toward the vehicle rear side, that contacts the lower wall portion, and that partitions the space portion into a driver's seat side and a front passenger's seat side, wherein:
    the base portion is elastically deformable,
    the sound insulating member has a high-density portion having a density higher than a density of the base portion, and
    the high-density portion is mounted to the base portion from the vehicle rear side further toward a vehicle lower side than the opening portion.

* * * * *